United States Patent
Gray

(10) Patent No.: US 10,996,762 B2
(45) Date of Patent: *May 4, 2021

(54) INTERACTIVE DISPLAY WITH TACTILE FEEDBACK

(71) Applicant: TACTILE DISPLAYS, LLC, Dallas, TX (US)

(72) Inventor: R. O'Neal Gray, Dallas, TX (US)

(73) Assignee: TACTILE DISPLAYS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,037

(22) Filed: Aug. 28, 2020

(65) Prior Publication Data
US 2020/0393906 A1 Dec. 17, 2020

Related U.S. Application Data

(63) Continuation of application No. 16/840,025, filed on Apr. 3, 2020, which is a continuation of application
(Continued)

(51) Int. Cl.
*G06F 3/01* (2006.01)
*G06F 3/0489* (2013.01)
(Continued)

(52) U.S. Cl.
CPC ............ *G06F 3/016* (2013.01); *G06F 3/0202* (2013.01); *G06F 3/041* (2013.01); *G06F 3/0489* (2013.01);
(Continued)

(58) Field of Classification Search
CPC ........ G06F 3/041; G06F 3/016; G06F 3/0202; G06F 3/04886; G06F 3/0489; G06F 2203/04809; G09B 21/003
(Continued)

(56) References Cited

U.S. PATENT DOCUMENTS 3,641,568 A 2/1972 Brescia et al.
3,675,513 A 7/1972 Flanagan et al.
(Continued)

FOREIGN PATENT DOCUMENTS

CA 1243096 10/1998
DE 102 51 296 5/2004
(Continued)

OTHER PUBLICATIONS

"4-Wire Resistive Touchscreens" obtained from http://www.touchscreens.com/intro-touchtypes-4resistive.html generated Aug. 5, 2005.
(Continued)

*Primary Examiner* — Alexander Eisen
*Assistant Examiner* — Nathaniel P Brittingham
(74) *Attorney, Agent, or Firm* — Amster Rothstein & Ebenstein LLP

(57) ABSTRACT

An electronic device including a housing having a first surface and a second surface, and an interactive display having a keyboard-enabled mode and a keyboard-disabled mode. The interactive display includes a first image display device disposed at the first surface that displays image data, and a physical keypad disposed at the second surface that provides tactile feedback to a user only when the interactive display is in the keyboard-enabled mode, the physical keypad being substantially smooth when the interactive display is in the keyboard-disabled mode.

11 Claims, 18 Drawing Sheets

Related U.S. Application Data

No. 16/430,544, filed on Jun. 4, 2019, now Pat. No. 10,719,131, which is a continuation of application No. 16/132,678, filed on Sep. 17, 2018, now Pat. No. 10,459,523, which is a continuation of application No. 15/369,591, filed on Dec. 5, 2016, now Pat. No. 10,216,279, which is a continuation of application No. 12/849,530, filed on Aug. 3, 2010, now Pat. No. 9,513,705, which is a continuation-in-part of application No. 12/759,410, filed on Apr. 13, 2010, now Pat. No. 8,665,228.

(60) Provisional application No. 61/353,509, filed on Jun. 10, 2010.

(51) Int. Cl.
    *G06F 3/041* (2006.01)
    *G09B 21/00* (2006.01)
    *G06F 3/0488* (2013.01)
    *G06F 3/02* (2006.01)

(52) U.S. Cl.
    CPC ....... G06F 3/04886 (2013.01); G09B 21/003 (2013.01); *G06F 2203/04809* (2013.01)

(58) Field of Classification Search
    USPC .................................................. 345/173–178
    See application file for complete search history.

(56) References Cited

U.S. PATENT DOCUMENTS

| | | |
|---|---|---|
| 3,995,126 A | 11/1976 | Larson |
| 1,127,752 A | 11/1978 | Lowthorp |
| 4,194,097 A | 3/1980 | Bradam |
| 4,508,942 A | 4/1985 | Inaba |
| 4,544,276 A | 10/1985 | Horodeck |
| 4,654,715 A | 3/1987 | Feldman et al. |
| 4,672,558 A | 6/1987 | Beckes et al. |
| 4,692,809 A | 9/1987 | Beining et al. |
| 4,695,827 A | 9/1987 | Beining et al. |
| 4,707,570 A | 11/1987 | Ide et al. |
| 4,733,222 A | 3/1988 | Evans |
| 4,734,685 A | 3/1988 | Watanabe |
| 4,737,980 A | 4/1988 | Curtin et al. |
| 4,746,770 A | 5/1988 | McAvinney |
| 4,771,276 A | 9/1988 | Parks |
| 4,788,384 A | 11/1988 | Bruere-Dawson et al. |
| 4,806,846 A | 2/1989 | Kerber |
| 4,898,555 A | 2/1990 | Sampson |
| 4,940,346 A | 7/1990 | Liljenquist |
| 4,968,877 A | 11/1990 | McAvinney et al. |
| 4,990,900 A | 2/1991 | Kikuchi |
| 5,003,519 A | 3/1991 | Noirjean |
| 5,017,030 A | 5/1991 | Crews |
| 5,128,672 A | 7/1992 | Kaehler |
| 5,178,477 A | 1/1993 | Gambaro |
| 5,189,403 A | 2/1993 | Franz et al. |
| 5,194,862 A | 3/1993 | Edwards |
| 5,224,861 A | 7/1993 | Glass et al. |
| 5,241,308 A | 8/1993 | Young |
| 5,252,951 A | 10/1993 | Tannenbaum et al. |
| 5,258,748 A | 11/1993 | Jones |
| 5,281,966 A | 1/1994 | Walsh |
| 5,305,017 A | 4/1994 | Gerpheide |
| 5,311,175 A | 5/1994 | Waldman |
| 5,345,543 A | 9/1994 | Capps et al. |
| 5,376,948 A | 12/1994 | Roberts |
| 5,379,057 A | 1/1995 | Clough et al. |
| 5,442,742 A | 2/1995 | Greyson et al. |
| 5,398,310 A | 3/1995 | Tchao et al. |
| 5,412,189 A | 5/1995 | Cragun |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,513,309 A | 4/1996 | Meier et al. |
| 5,523,775 A | 6/1996 | Capps |
| 5,530,455 A | 6/1996 | Gillick et al. |
| 5,543,590 A | 8/1996 | Gillespie et al. |
| 5,543,591 A | 8/1996 | Gillespie et al. |
| 5,544,305 A | 8/1996 | Ohmaye et al. |
| 5,563,632 A | 10/1996 | Roberts |
| 5,563,996 A | 10/1996 | Tchao |
| 5,565,658 A | 10/1996 | Gerpheide et al. |
| 5,579,036 A | 11/1996 | Yates, IV |
| 5,581,681 A | 12/1996 | Tchao et al. |
| 5,583,946 A | 12/1996 | Gourdol |
| 5,590,219 A | 12/1996 | Gourdol |
| 5,592,566 A | 1/1997 | Pagallo et al. |
| 5,594,810 A | 1/1997 | Gourdol |
| 5,596,694 A | 1/1997 | Capps |
| 5,612,719 A | 3/1997 | Beernink et al. |
| 5,631,805 A | 5/1997 | Bonsall |
| 5,633,955 A | 5/1997 | Bozinovic et al. |
| 5,634,102 A | 5/1997 | Capps |
| 5,635,958 A | 6/1997 | Murai |
| 5,636,101 A | 6/1997 | Bonsall et al. |
| 5,642,108 A | 6/1997 | Gopher et al. |
| 5,644,657 A | 7/1997 | Capps et al. |
| 5,660,488 A | 8/1997 | Miller |
| 5,666,113 A | 9/1997 | Logan |
| 5,666,502 A | 9/1997 | Capps |
| 5,666,552 A | 9/1997 | Grayson et al. |
| 5,675,361 A | 10/1997 | Santilli |
| 5,675,362 A | 10/1997 | Clough et al. |
| 5,677,710 A | 10/1997 | Thompson-Rohrlich |
| 5,689,253 A | 11/1997 | Hargreaves et al. |
| 5,710,844 A | 1/1998 | Capps et al. |
| 5,729,250 A | 3/1998 | Bishop et al. |
| 5,730,165 A | 3/1998 | Philipp |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,746,818 A | 5/1998 | Yatake |
| 5,748,269 A | 5/1998 | Harris et al. |
| 5,764,222 A | 6/1998 | Shieh |
| 5,767,457 A | 6/1998 | Gerpheide et al. |
| 5,767,842 A | 6/1998 | Korth |
| 5,790,104 A | 8/1998 | Shieh |
| 5,790,107 A | 8/1998 | Kasser et al. |
| 5,802,516 A | 9/1998 | Shwarts et al. |
| 5,808,567 A | 9/1998 | McCloud |
| 5,809,267 A | 9/1998 | Moran et al. |
| 5,818,437 A | 10/1998 | Grover et al. |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,835,080 A | 11/1998 | Beeleson et al. |
| 5,838,138 A | 11/1998 | Henty |
| 5,854,625 A | 12/1998 | Frisch et al. |
| 5,880,411 A | 3/1999 | Gillespie et al. |
| 5,880,539 A | 3/1999 | Chen |
| 5,898,434 A | 4/1999 | Small et al. |
| 5,911,529 A | 6/1999 | Crisan |
| 5,920,309 A | 7/1999 | Bisset et al. |
| 5,923,319 A | 7/1999 | Bishop et al. |
| 5,926,566 A | 7/1999 | Wang et al. |
| 5,933,134 A | 8/1999 | Shieh |
| 5,943,044 A | 8/1999 | Martinelli et al. |
| 6,002,389 A | 12/1999 | Kasser |
| 6,002,808 A | 12/1999 | Freeman |
| 6,020,881 A | 2/2000 | Naughton et al. |
| 6,031,524 A | 2/2000 | Kunert |
| 6,037,882 A | 3/2000 | Levy |
| 6,043,761 A | 3/2000 | Burrell, IV |
| 6,050,825 A | 4/2000 | Nichol et al. |
| 6,052,339 A | 4/2000 | Frenkel et al. |
| 6,072,494 A | 6/2000 | Nguyen |

(56) References Cited

U.S. PATENT DOCUMENTS

| | | |
|---|---|---|
| 6,084,576 A | 7/2000 | Leu et al. |
| 6,094,197 A | 7/2000 | Buxton et al. |
| 6,107,997 A | 8/2000 | Ure |
| 6,128,003 A | 10/2000 | Smith et al. |
| 6,131,299 A | 10/2000 | Raab et al. |
| 6,135,958 A | 10/2000 | Mikula-Curtis et al. |
| 6,144,380 A | 11/2000 | Schwarts et al. |
| 6,188,391 B1 | 2/2001 | Seely et al. |
| 6,198,515 B1 | 3/2001 | Cole |
| 6,208,329 B1 | 3/2001 | Ballare |
| 6,222,465 B1 | 4/2001 | Kumar et al. |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,271,835 B1 | 8/2001 | Hoeksma |
| 6,288,707 B1 | 9/2001 | Philipp |
| 6,289,326 B1 | 9/2001 | LaFleur |
| 6,292,178 B1 | 9/2001 | Bernstein et al. |
| 6,323,846 B1 | 11/2001 | Westerman et al. |
| 6,347,290 B1 | 2/2002 | Bartlett |
| 6,356,259 B1 | 3/2002 | Maeda et al. |
| 6,377,009 B1 | 4/2002 | Philipp |
| 6,380,931 B1 | 4/2002 | Gillespie et al. |
| 6,411,287 B1 | 6/2002 | Scharff et al. |
| 6,414,671 B1 | 7/2002 | Gillespie et al. |
| 6,421,234 B1 | 7/2002 | Ricks et al. |
| 6,429,846 B2 | 8/2002 | Rosenberg et al. |
| 6,452,514 B1 | 9/2002 | Philipp |
| 6,457,355 B1 | 10/2002 | Philipp |
| 6,466,036 B1 | 10/2002 | Philipp |
| 6,497,521 B1 | 12/2002 | Lohr |
| 6,515,669 B1 | 2/2003 | Mohri |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,570,557 B1 | 5/2003 | Westerman et al. |
| 6,593,916 B1 | 7/2003 | Aroyan |
| 6,610,936 B2 | 8/2003 | Gillepsie et al. |
| 6,624,833 B1 | 9/2003 | Kumar et al. |
| 6,639,577 B2 | 10/2003 | Eberhard |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,706,552 B2 | 3/2004 | Getz et al. |
| 6,724,366 B2 | 4/2004 | Crawford |
| 6,757,002 B1 | 6/2004 | Oross et al. |
| 6,803,906 B1 | 10/2004 | Morrison et al. |
| 6,822,635 B2 | 11/2004 | Shahoian et al. |
| 6,842,672 B1 | 1/2005 | Straub et al. |
| 6,856,259 B1 | 2/2005 | Sharp |
| 6,888,536 B2 | 5/2005 | Westerman et al. |
| 6,900,795 B1 | 5/2005 | Knight, III et al. |
| 6,927,761 B2 | 8/2005 | Badaye et al. |
| 6,942,571 B1 | 9/2005 | McAllister et al. |
| 6,965,375 B1 | 11/2005 | Gettemy et al. |
| 6,972,401 B2 | 12/2005 | Akitt et al. |
| 6,977,666 B1 | 12/2005 | Hedrick |
| 6,985,801 B1 | 1/2006 | Straub et al. |
| 6,992,659 B2 | 1/2006 | Gettemy |
| 7,031,228 B2 | 4/2006 | Born et al. |
| 7,129,416 B1 | 10/2006 | Steinfeld et al. |
| 7,148,875 B2 | 12/2006 | Rosenberg et al. |
| 7,339,572 B2 | 3/2008 | Schena |
| RE40,993 E | 11/2009 | Westerman |
| 7,630,200 B1 | 12/2009 | Eidershaw |
| 7,683,888 B1 | 3/2010 | Kennedy |
| 7,748,634 B1 | 7/2010 | Zehr et al. |
| 7,808,479 B1 | 10/2010 | Hotelling et al. |
| 7,978,181 B2 | 7/2011 | Westerman |
| 8,005,518 B1 | 8/2011 | Birsel |
| 8,115,745 B2 | 2/2012 | Gray |
| 8,456,426 B2 | 6/2013 | Ishihara et al. |
| RE44,913 E | 5/2014 | Bickerton |
| 2002/0118175 A1 | 8/2002 | Liebenow |
| 2002/0149570 A1 | 10/2002 | Knowles et al. |
| 2003/0006974 A1 | 1/2003 | Clough et al. |
| 2003/0095095 A1 | 5/2003 | Pihlaja |
| 2003/0206202 A1 | 11/2003 | Moriya |
| 2003/0234768 A1 | 12/2003 | Rekimoto |
| 2004/0001040 A1 | 1/2004 | Kardach et al. |
| 2004/0208681 A1 | 10/2004 | Dechene |
| 2004/0229663 A1 | 11/2004 | Tosey et al. |
| 2004/0263481 A1 | 12/2004 | Nishikawa et al. |
| 2004/0263484 A1 | 12/2004 | Montysalo et al. |
| 2005/0017947 A1 | 1/2005 | Shahoian et al. |
| 2005/0052430 A1 | 3/2005 | Shahoian et al. |
| 2005/0104867 A1 | 5/2005 | Westerman et al. |
| 2005/0125570 A1 | 6/2005 | Olodort et al. |
| 2005/0190159 A1 | 9/2005 | Skarine |
| 2006/0033724 A1 | 2/2006 | Chaudhri et al. |
| 2006/0053387 A1 | 3/2006 | Ording |
| 2006/0084482 A1 | 4/2006 | Saila |
| 2006/0085757 A1 | 4/2006 | Andre et al. |
| 2006/0097993 A1 | 5/2006 | Hietala |
| 2006/0119589 A1 | 6/2006 | Rosenberg et al. |
| 2006/0187215 A1 | 8/2006 | Rosenberg et al. |
| 2006/0192771 A1 | 8/2006 | Rosenberg et al. |
| 2006/0197753 A1 | 9/2006 | Hotelling |
| 2006/0232567 A1 | 10/2006 | Westerman et al. |
| 2006/0238510 A1 | 10/2006 | Panotopoulos et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2007/0004451 A1 | 1/2007 | Anderson |
| 2007/0013662 A1 | 1/2007 | Fauth |
| 2007/0013665 A1 | 1/2007 | Vetelainen |
| 2007/0013677 A1 | 1/2007 | Rosenberg et al. |
| 2007/0040815 A1 | 2/2007 | Rosenberg et al. |
| 2007/0091070 A1 | 4/2007 | Larsen |
| 2007/0229464 A1 | 10/2007 | Hotelling et al. |
| 2007/0229478 A1 | 10/2007 | Rosenberg et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2008/0060856 A1 | 3/2008 | Shahoian et al. |
| 2008/0062134 A1 | 3/2008 | Duarte |
| 2008/0062143 A1 | 3/2008 | Shahoian et al. |
| 2008/0062144 A1 | 3/2008 | Shahoian et al. |
| 2008/0062145 A1 | 3/2008 | Shahoian et al. |
| 2008/0068348 A1 | 3/2008 | Rosenberg et al. |
| 2008/0068349 A1 | 3/2008 | Rosenberg et al. |
| 2008/0068350 A1 | 3/2008 | Rosenberg et al. |
| 2008/0068351 A1 | 3/2008 | Rosenberg et al. |
| 2008/0122796 A1 | 5/2008 | Jobs |
| 2008/0145127 A1 | 6/2008 | Liu |
| 2008/0303796 A1* | 12/2008 | Fyke .................... G06F 3/0236 345/173 |
| 2008/0316180 A1 | 12/2008 | Carmody |
| 2009/0046076 A1 | 2/2009 | Bychkov |
| 2009/0081990 A1 | 3/2009 | Granucci et al. |
| 2009/0091537 A1 | 4/2009 | Huang |
| 2009/0128503 A1* | 5/2009 | Grant .................. G06F 3/04886 345/173 |
| 2009/0135161 A1 | 5/2009 | Endo |
| 2009/0167509 A1 | 7/2009 | Fadell |
| 2009/0183098 A1 | 7/2009 | Casparian |
| 2009/0213081 A1 | 8/2009 | Case, Jr. |
| 2009/0249247 A1 | 10/2009 | Tseng et al. |
| 2009/0315830 A1 | 12/2009 | Westerman |
| 2010/0099670 A1 | 4/2010 | Kim |
| 2010/0100839 A1 | 4/2010 | Tseng et al. |
| 2010/0134418 A1 | 6/2010 | Muresianu |
| 2010/0177050 A1* | 7/2010 | Heubel ................... G06F 3/016 345/173 |
| 2010/0185989 A1 | 7/2010 | Shiplacoff et al. |
| 2010/0207887 A1 | 8/2010 | Jepsen |
| 2010/0251152 A1 | 9/2010 | Cho |

(56) References Cited

U.S. PATENT DOCUMENTS

| | | | |
|---|---|---|---|
| 2010/0277430 A1 | 11/2010 | Cruz-Hernandez |
| 2010/0299638 A1 | 11/2010 | Choi |
| 2010/0328191 A1 | 12/2010 | Smith et al. |
| 2010/0328251 A1 | 12/2010 | Sinclair |
| 2011/0021251 A1 | 1/2011 | Linden |
| 2011/0032211 A1 | 2/2011 | Christoffersen |
| 2011/0047459 A1 | 2/2011 | Van Der Westhuizen |
| 2011/0221682 A1 | 3/2011 | Gao |
| 2011/0141679 A1 | 6/2011 | Dai et al. |
| 2011/0161809 A1 | 6/2011 | Gilmour |
| 2011/0201387 A1* | 8/2011 | Paek .................... G06F 40/166 455/566 |
| 2011/0216064 A1 | 9/2011 | Dahl et al. |
| 2011/0234498 A1 | 9/2011 | Gray |
| 2011/0261058 A1 | 10/2011 | Luo |
| 2012/0181522 A1 | 7/2012 | Yamazaki et al. |

FOREIGN PATENT DOCUMENTS

| | | |
|---|---|---|
| DE | 10324580 | 12/2004 |
| EP | 0 288 692 | 7/1993 |
| EP | 0 664 504 | 1/1995 |
| EP | 0 464 908 | 9/1996 |
| EP | 0915490 | 5/1999 |
| EP | 1 014 295 | 1/2002 |
| GB | 2009047 | 6/1979 |
| JP | 2000-56912 A | 2/2000 |
| JP | 4019512 B2 | 2/2000 |
| JP | 2000-148366 A | 5/2000 |
| WO | WO 1997018547 | 5/1997 |
| WO | WO 1997023738 | 7/1997 |
| WO | WO 199814863 | 4/1998 |
| WO | 9938149 | 7/1999 |
| WO | 00/58816 A2 | 10/2000 |
| WO | WO 2003088176 | 10/2003 |
| WO | 200409488 | 12/2004 |
| WO | WO 2006023569 | 3/2006 |
| WO | 2007127585 | 11/2007 |
| WO | 2009084147 A1 | 7/2009 |
| WO | 2010029448 A1 | 3/2010 |

OTHER PUBLICATIONS

"5-Wire Resistive Touchscreens" obtained from http://touchscreens.com/intro-touchtypes-resistive.html generated Aug. 5,2005.
"A Brief Overview of Gesture Recognition" obtained from http://www.dai.ed.ac.uk/Cvonline/LOCA_COPIES/COHEN/gesture_overview.html, generated Apr. 2004.
"Capacitive Touchscreens" obtained from http://www.touchscreens.com/intro-touchtypes-capacitive.html generated Aug. 5, 2005.
"Capacitive Positions Sensing" obtained from http://www.synaptics.com/technology/cps.cfm generated Aug. 5. 2005.
"Comparing Touch Technologies" obtained from http://www.touchscreens.com/intro-touchtypes.html generated Oct. 10, 2004.
"Gesture Recognition" http://www.fingerworks.com/gesture_recognition.html.
"GlidePoint®" obtained from http://www.cirque.com/technology/technology_gp.html generated Aug. 5, 2005.
How do touchscreen monitors know where you're touching? obtained from http://www.electronics.howstuffworks.com/question716.html generated Aug. 5, 2005.
"How does a touchscreen work?" obtained from http://www.touchscreens.com/intro-anatomy.html generated Aug. 5, 2005.
"IGesture Products for Everyone (learn in minutes) Product Overview" Fingerworks.com.
"Infrared Touchscreens" obtained from http://www.touchscreens.com/intro-touchtypes-infrared.html generated Aug. 30, 2005.
"Mouse Emulation" FingerWorks obtained from http://www.fingerworks.com/gesture_guide_mouse.html generated Aug. 30, 2005.
"Mouse Gestures in Opera" obtained from http://www.opera.com/products/desktop/mouse/index.dml generated Aug. 30, 2005.

"Mouse Gestures," Optim oz, May 21, 2004.
"MultiTouch Overview" FingerWorks obtained from http://www.fingerworks.com/multoverview.html generated Aug. 30, 2005.
"Near Field Imaging Touchscreens" obtained from Hhttp://www.touchscreens.com/intro-touchtypes-nfi.html generated Aug. 5, 2005.
"PenTouch Capacitive Touchscreens" obtained from http://www.touchscreens.com/intro-touchtypes-pentouch.html generated Aug. 5, 2005.
"Surface Acoustic Wave Touchscreens" obtained from http://www.touchscreens.com/intro-touchtypes-saw.html generated Aug. 5, 2005.
"Symbol Commander" obtained from http://www.sensiva.com/symbolcommander/, generated Aug. 30, 2005.
"Tips for Typing" FingerWorks http://fingerworks.com/mini_typing.html generated Aug. 30, 2005.
"Touch Technologies Overview" 2001, 3M Touch Systems, Massachusetts.
"Wacom Components—Technology" obtained from http://www.wacom-components.com/english/tech.asp generated on Oct. 10, 2004.
"Watershed Algorithm" http://rsb.info.nih.gov/ij/plugins/watershed.html generated Aug. 5, 2005.
"FingerWorks—Gesture Guide—Application Switching," obtained from http://fingerworks.com/gesture_guide_apps.html, generated on Aug. 27, 2004, 1-pg.
"FingerWorks—Gesture Guide—Editing," obtained from http://www.fingerworks.com/gesture_guide_editing.html, generated on Aug. 27, 2004, 1-pg.
"FingerWorks—Gesture Guide—File Operations," obtained from http://www.fingerworks.com/gesture_guide_files.html, generated on Aug. 27, 2004.
"FingerWorks—Gesture Guide—Text Manipulation," obtained from http://www.fingerworks.com/gesture_guide_text_manip.html, generated on Aug. 27, 2004, 2-pg.
"FingerWorks—Gesture Guide—Tips and Tricks," obtained from http://www.fingerworks.com/gesture_guide_tips.html, generated Aug. 27, 2004, 2-pgs.
"FingerWorks—Gesture Guide—Web," obtained from http://www.fingerworks.com/gesture_guide_web.html, generated on Aug. 27, 2004, 1-pg.
"FingerWorks—Guide to Hand Gestures for USB Touchpads," obtained from' http://www.fingerworks.com/igesture_userguide.html, generated Aug. 27, 2004, 1-pg.
"FingerWorks—iGesture—Technical Details," obtained from http://www.fingerworks.com/igesture_tech.html, generated Aug. 27, 2004, 1-pg.
"FingerWorks—The Only Touchpads with Ergonomic Full-Hand Resting and Relaxation!" obtained from http://fingerworks.com/resting.html,Copyright 2001, 1-pg.
"FingerWorks—Tips for Trying on the Mini," obtained from http://fingerworks.com/igesture.html, generated Aug. 27, 2004, 2-pgs.
"iGesture Pad—the Multifinger USB TouchPad with Whole-Hand Gestures," obtained from http://fingerworks.com/igestures.html, generated Aug. 27, 2004, 2pgs.
Bier, et al., "Tooglass and Magic Lenses: The see-through interface" In James Kijiya, editor, Computer Graphics (SIGGRAPH '93 Proceedings), vol. 27, pp. 73-80, Aug. 1993.
Douglas et al., *The Ergonomics of Computer Pointing Devices* (1997).
European Search Report received in EP 1 621 989 (@ Beyer Weaver & Thomas, LLP) dated Mar. 27, 2006.
EVB Elektronik "TSOP6238 IR Receiver Modules for Infrared Remote Control Systems" dated Jan. 2004 1-pg.
Fisher et al., "Repetitive Motion Disorders: The Design of Optimal Rate—Rest Profiles," Human Factors, 35(2):283-304 (Jun. 1993).
Fukumoto, et al., "ActiveClick: Tactile Feedback for Touch Panels," in CHI 2001 Summary, pp. 121-122, 2001.
Fukumoto and Yoshinobu Tonomura, "Body Coupled Fingering: Wireless Wearable Keyboard," *CHi* 97, pp. 147-154 (Mar. 1997).
Hardy, "Fingerworks" Mar. 7, 2002; BBC World on Line.
Hillier and Gerald J. Lieberman, *Introduction to Operations Research* (1986).
International Search Report dated Mar. 3, 2006 (PCT/US 05/03325; 119-0052WO).

(56) References Cited

OTHER PUBLICATIONS

Jacob et al., "Integrality and Separability of Input Devices," *ACM Transactions on Computer-Human Interaction*, 1:3-26 (Mar. 1994).
Kinkley et al., "Touch-Sensing Input Devices," in CHI '99 Proceedings, pp. 223-230, 1999.
KIONX "KXP84 Series Summary Data Sheet" copyright 2005, dated Oct. 21, 2005, 4-pgs.
Surur, "As usual Microsoft did the "Touch Bar" first, but actually thought better of it (video)", MSPoweruser, published Oct. 27, 2016, https://mspoweruser.com/as-usual-microsoft-did-the-touch-bar-first-but-actually-thoughtbetter-of-it-video/.
MS Applied Science, "UIST Student Innovation Contest 2010 Concept Overview (video)", published Aug. 9, 2010, https://www.youtube.com/watch?v=ojusRO38Tdc&feature=emb_title.
Kim, Seung Wook and Marti, Stefan, Hewlett-Packard, RightsLink, CHI 2012, May 5-10, 2012, Austin, Texas, USA, Ghost Fingers: A Hybrid Approach to the Interaction with Remote Displays.
Lee, et al. "A Multi-Touch Three Dimensional Touch Sensitive Tablet," in CHI '85 Proceedings, pp. 121-128, 2000.
Matsushita, et ai, "HoloWall: Designing a Finger, Hand, Body and Object Sensitive Wall," In Proceedings of UIST '97, Oct. 1997.
Quantum Research Group "QT510IQWheel™ Touch Slider IC" copyright 2004-2005, 14-pgs.
Quek, "Unencumbered Gestural Interaction," IEEE Multimedia, 3:36-47 (Winter 1996).
Radwin, "Activation Force and Travel Effects on Overexertion in Repetitive Key Tapping," Human Factors, 39(1):130-140 (Mar. 1997).
Rekimoto, "SmartSkin: An Infrastructure for Freehand Manipulation on Interactive Surfaces" CHI 2002, Apr. 20-25, 2002.
Rekimoto, et al., "ToolStone: Effective Use of the Physical Manipulation Vocabularies of Input Devices," In Proc. of UIST 2000, 2000.
Rubine, et ai, "Programmable Finger-Tracking Instrument Controllers," Computer Music Journal, vol. 14, No. 1 (Spring 1990).
Rutledge, et al., "Force-To-Motion Functions for Pointing," Human-Computer Interaction—INTERACT (1990).
Subatai Ahmad, "A Usable Real-Time 3D Hand Tracker," Proceedings of the 28th Asilomar Conference on Signals, Systems and Computers—Part 2 (of 2), vol. 2 (Oct. 1994).
Texas Instruments "TSC2003/12C Touch Screen Controller" Data Sheet SBAS 162, dated Oct. 2001, 20 pgs.
Wellner, "The Digital Desk Calculations: Tangivle Manipulation on a Desk Top Display" in ACM UIST '91 Proceedings, pp. 27-34, Nov. 1991.
Williams, "Applications for a Sitched-Capacitor Instrumentation Building Block" Linear Technology Application Note 3, Jul. 1985; pp. 1-16.
Yamada, et al_, "A Switched-Capacitor Interface for Capacitive Pressure Sensors" IEEE Transactions on Instrumentation and Measurement, vol. 41, No. 1, Feb. 1992, pp. 81-86.
Yeh, et al., "Switched Capacitor Interface Circuit for Capacitive Transducers" 1985 IEEE.
Zhai, et al., "Dual Stream Input for pointing and Scrolling," Proceedings of CHI '97 Extended Abstracts (1997).
Zimmerman, et al., "Applying Electric Field Sensing to Human-Computer Interfaces," in CHI '85 Proceedings, pp. 280-287, 1995.
International Search Report dated Jan. 2, 2008 for peT Application No. PCT/US2007/066022, filed Apr. 5, 2007, 2 pages.
Jenna Wortham and Matt Richtel, Makers Hope Touch Screens Will Help Cellphone Sales, NY Times, Dec. 1, 2008, at B1.
Prosecution History of U.S. Pat. No. 6,885,318, issued Apr. 26, 2005.
Ball T et al., "If Your Version Control System Could Talk," ICSE workshop on process modeling and empirical studies of software engineering, Oct. 1997.
Technical Note TN1152, Jis Keyboard Support in Mac OS 8, Developer Connection, Aug. 31, 2017, http://mirror.informatimago.com/next/developer.apple.com/technotes/tn/tn1152.html.
Jagadeesan L J et al., "Specification-based Testing of Reactive Software: Tools and Experiments, Experience Report," Proceedings of the (19th) International Conference on Software Engineering, 1997.
Kurtenbach G et al., "The Limits of Expert Performance Using Hierarchic Marking Menus," : CHI '93: Proceedings of the INTERACT '93 and CHI '93 Conference on Human Factors in Computing Systems, May 1993, pp. 482-487, http://doi.org/10.1145/169059.169426.
Matias E, "Half-Qwerty: Typing with One Hand Using Your Two-handed Skills," Conference Companion, CHI '94, Apr. 24-28, 1994.
Matias E, "Half Qwerty: A One-handed Keyboard Facilitating Skill Transfer From Qwerty," Proceedings of the INTERCHI '93 Conference on Human Factors in Computing Systems (pp. 88-94).
Newton Apple MessagePad Handbook, 1995 Apple Computer, Inc.
Nielsen J, "Usability Engineering," Apr. 1993.
Nokia User's Manual, 9357109, Issue 2 EN, 1998.
Matias E, "One Handed Touch Typing on a Qwerty Keyboard," Human-Computer Interaction, 1996, vol. 11, pp. 1-27.
Perpich J M et al., "Anywhere, Anytime Code Inspections: Using the Web to Remove Inspection Bottlenecks in Large-Scale Software Development," In Proceedings of the 19th International Conference on Software Engineering, 1997.
Prosecution History of U.S. Pat. No. RE44,913, issued May 27, 2014.
Psion Series 3a User Guide, Jul. 1993.
Psion Series 5mx User Guide, Oct. 1999.
Rosenberg, J M, Dictionary of Computers, Data Processing, and Telecommunications, 1984.
Shneiderman B, "Designing the User Interface: Strategies for Effective Human-Computer Interaction," 1987.
Shneiderman B, "Direct Manipulation: A Step Beyond Programming Languages," Computer, Aug. 1983.
Simon Users Manual, Part No. 82G2557.
Wisconsin Magazine of History, State Historical Society of Wisconsin, Jun. 1949.

\* cited by examiner

INTERACTIVE DISPLAY WITH TACTILE FEEDBACK

RELATED APPLICATIONS

This application is a continuation of U.S. patent application Ser. No. 16/840,025, filed on Apr. 3, 2020, and entitled Interactive Display With Tactile Feedback, which is a continuation of U.S. patent application Ser. No. 16/430,544, filed on Jun. 4, 2019, and entitled Interactive Display With Tactile Feedback, now U.S. Pat. No. 10,719,131, which is a continuation of U.S. patent application Ser. No. 16/132,678, filed Sep. 17, 2018, entitled Interactive Display With Tactile Feedback, now U.S. Pat. No. 10,459,523, which is a continuation of U.S. patent application Ser. No. 15/369,591, filed Dec. 5, 2016, entitled Interactive Display With Tactile Feedback, now U.S. Pat. No. 10,216,279, which is a continuation of U.S. patent application Ser. No. 12/849,530, filed Aug. 3, 2010, entitled Interactive Display with Tactile Feedback, now U.S. Pat. No. 9,513,705, which claims priority to U.S. Provisional Patent Application 61/353,509, filed Jun. 10, 2010, and which is a continuation-in-part of U.S. patent application Ser. No. 12/759,410, entitled Energy Efficient Interactive Display With Energy Regenerative Keyboard, filed Apr. 13, 2010, now U.S. Pat. No. 8,665,228, the contents of which are incorporated herein by reference in their entirety.

FIELD OF THE INVENTION

The present invention relates to interactive displays for electronic devices, and in particular to an interactive display that provide tactile feedback to a user when the user applies pressure to the interactive display.

SUMMARY OF THE INVENTION

An electronic device according to an exemplary embodiment of the present invention comprises: a housing comprising a first surface and a second surface; an interactive display having a keyboard-enabled mode and a keyboard-disabled mode, the interactive display comprising: a first image display device disposed at the first surface that displays image data; and a physical keypad disposed at the second surface that provides tactile feedback to a user only when the interactive display is in the keyboard-enabled mode, the physical keypad being substantially smooth when the interactive display is in the keyboard-disabled mode.

In at least one embodiment, the first image display device displays an imaged keypad comprising imaged keys when the interactive display is in the keyboard-enabled mode.

In at least one embodiment, the electronic device further comprises a second image display device disposed at the second surface.

In at least one embodiment, the physical keypad disposed at the second surface comprises one or more physical keys that control activation of the imaged keys within the imaged keypad.

In at least one embodiment, the physical keypad disposed at the second surface comprises one or more physical keys that perform a different function from the one or more imaged keys of the imaged keypad.

In at least one embodiment, the electronic device further comprises a sensor that detects user interaction with the physical keypad disposed on the second surface; and an image generator that displays within the first image display device an imaged representation of the user interaction with the physical keypad disposed on the second surface.

In at least one embodiment, the sensor comprises one or more of the following sensor types: a motion sensor, a thermal sensor and a pressure sensor.

In at least one embodiment, the imaged representation of the user interaction comprises an imaged depiction of the user's finger or thumb interacting with the imaged keypad.

In at least one embodiment, the first and second surfaces are opposite from one another.

In at least one embodiment, the first and second surfaces are angled relative to one another.

In at least one embodiment, the first and second surfaces are adjacent to one another.

In at least one embodiment, the physical keypad comprises piezoelectric material.

In at least one embodiment, the piezoelectric material is quartz.

In at least one embodiment, the physical keypad comprises magnetostrictive material.

In at least one embodiment, the image display device is selected from one of the following types of image display devices: liquid crystal displays, digital light processor displays, plasma displays and light emitting diode displays.

In at least one embodiment, the electronic device is selected from one of the following types of electronic devices: cell phones, personal digital assistants, gaming devices, e-books, automatic teller machines and data input devices.

An electronic device according to an exemplary embodiment of the present invention comprises: a housing comprising a first surface and a second surface; and an interactive display having an interactive mode and a non-interactive mode, the interactive display comprising: an image display device disposed at the first surface of the housing that displays a user-interactive imaged keypad in at least a portion of the image display device when the interactive display is in the interactive mode and that displays other image data in the at least a portion of the image display device when the interactive display is in the non-interactive mode; a substantially transparent physical keypad disposed at the second surface of the housing that provides tactile feedback to a user indicating location of keys within the imaged keypad; a sensor that detects user interaction with the physical keypad; and an image generator that displays an imaged representation of the user interaction with the physical keypad within the imaged keypad.

In at least one embodiment, the sensor comprises one or more of the following sensor types: a motion sensor, a thermal sensor and a pressure sensor.

In at least one embodiment, the imaged representation of the user interaction comprises an imaged depiction of the user's finger or thumb interacting with the imaged keypad.

An electronic device according to an exemplary embodiment of the present invention comprises: an interactive display having an interactive mode and a non-interactive mode, the interactive display comprising: an image display device that displays a user-interactive imaged keypad in at least a portion of the image display device when the interactive display is in the interactive mode and that displays other image data in the at least a portion of the image display device when the interactive display is in the non-interactive mode; and a substantially transparent physical keypad that provides tactile feedback to a user indicating location of one or more imaged keys within the imaged keypad in response to one or more actuators disposed below the image display device.

An electronic device according to an exemplary embodiment of the present invention comprises: a housing comprising a first surface and a second surface; and an interactive display having an interactive mode and a non-interactive mode, the interactive display comprising: an image display device disposed at the first surface of the housing that displays a user-interactive imaged keypad in at least a portion of the image display device when the interactive display is in the interactive mode and that displays other image data in the at least a portion of the image display device when the interactive display is in the non-interactive mode; and a substantially transparent physical keypad disposed at the second surface of the housing that provides tactile feedback to a user indicating location of keys within the imaged keypad.

In at least one embodiment, the first and second surfaces are opposite from one another.

In at least one embodiment, the first and second surfaces are angled relative to one another.

In at least one embodiment, the first and second surfaces are adjacent to one another.

In at least one embodiment, the image display device is structured so as to form a seal for the electronic device.

In at least one embodiment, the physical keypad comprises one or more physical keys corresponding to the imaged keys.

In at least one embodiment, the image display device and the physical keypad are integral to one another.

In at least one embodiment, the one or more physical keys are made of substantially transparent material so that the imaged keys may be viewed within the one or more physical keys.

In at least one embodiment, the imaged keypad comprises one or more sub-keypads, each of the one or more sub-keypads being selectively activated.

In at least one embodiment, one or more portions of the physical keypad are selectively activated to correspond to the one or more sub-keypads.

In at least one embodiment, the physical keypad provides tactile feedback only when the interactive display is in the interactive mode.

In at least one embodiment, the physical keypad comprises piezoelectric material.

In at least one embodiment, the piezoelectric material is quartz.

In at least one embodiment, the physical keypad is made of a magnetostrictive material.

In at least one embodiment, the image display device is selected from one of the following types of image display devices: liquid crystal displays, digital light processor displays, plasma displays and light emitting diode displays.

In at least one embodiment, the image display device is a touchscreen image display device.

In at least one embodiment, the physical keypad comprises physical keys that extend through corresponding openings in the touchscreen image display device.

In at least one embodiment, the one or more actuators move at least one of the physical keypad and the touchscreen display device relative to one another so that the one or more physical keys protrude through the openings in the touchscreen display device when the interactive display is in the interactive mode.

In at least one embodiment, one or more of the physical keys each comprises one or more magnetic elements.

In at least one embodiment, the touchscreen display device comprises one or more charged electrical circuit elements so that movement of the one or more physical keys comprising the one or more magnetic elements relative to the charged electrical circuits elements generate electricity.

In at least one embodiment, the electronic device further comprises a protective layer disposed between the physical keypad and the at least one magnetic actuator to prevent damage to the magnetic actuator resulting from contact with the physical keys.

In at least one embodiment, the electronic device is selected from one of the following types of electronic devices: cell phones, personal digital assistants, automatic teller machines and data input devices.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE PREFERRED EMBODIMENT(S)

The present invention is directed to an electronic device including an interactive display having an interactive mode in which a user-interactive keypad is displayed in at least a portion of the interactive display and a non-interactive mode in which other image data is displayed in the portion of the interactive display. The interactive display includes a substantially transparent keypad portion that provides tactile feedback to allow the user to locate individual keys within the keypad portion. The present invention is applicable to any electronic device having a touchscreen display, including, for example, personal digital assistants (PDAs), cell phones, automated teller machines (ATMs), computers (including laptop and desktop computers), gaming devices, television monitors, video conferencing equipment, e-books (e.g., Amazon Kindle™ and Barnes & Noble Nook™) remote control devices and any general data input device.

Figure 1A:
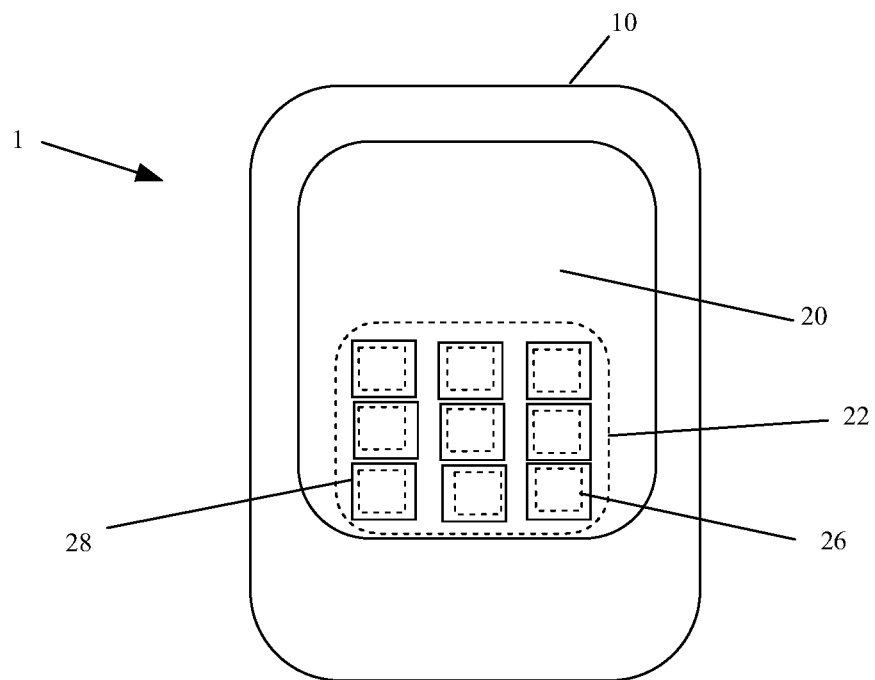
FIGS. 1A and 1B are front views of an electronic device according to an exemplary embodiment of the present invention.
Figure 1B:
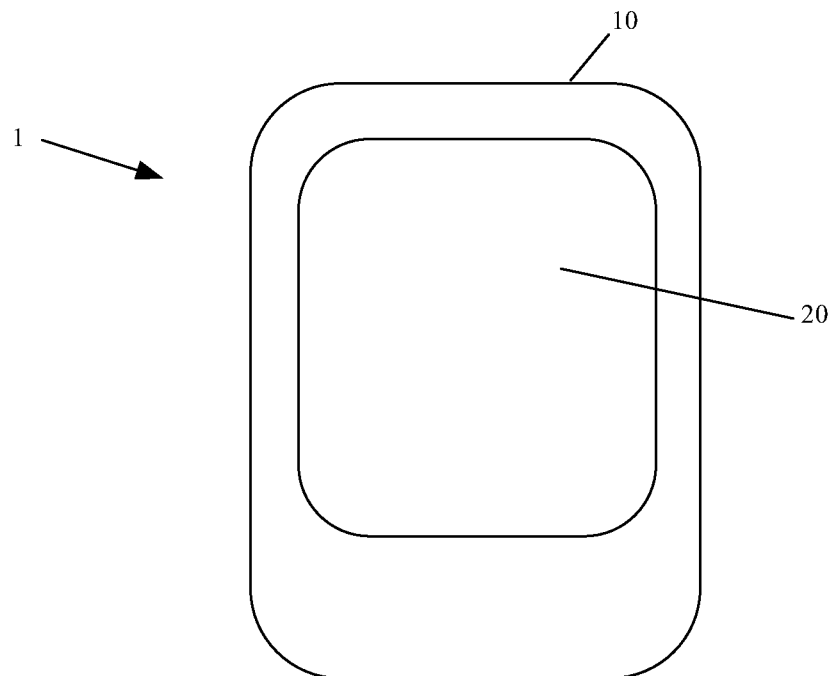

FIGS. 1A and 1B are front views of an electronic device, generally designated by reference number 1, according to an exemplary embodiment of the present invention. In the present embodiment, the electronic device 1 may be, for example, a PDA, cell phone, a gaming device or other hand-held mobile device. The electronic device 1 includes a housing 10 and an interactive display 20. The housing 10 protects the internal electronic components of the electronic device 1, and clips or other similar elements may be disposed on the outside of the housing 10 to allow the electronic device to be attached to an object.

In FIG. 1A, the electronic device 1 is in an interactive mode. In this mode, an interactive keypad 22 is displayed within a portion of the interactive display 20. The interactive keypad 22 includes one or more imaged keys 26. Each imaged key 26 may be "pressed" by a user to input data to the electronic device 1 by applying physical pressure to the interactive display 20 over the imaged key 26. Such "touchscreen" technology is well known in the art, such as in U.S. Pat. Nos. 5,815,141, 6,297,811, and 5,784,054, the contents of which are incorporated herein by reference. One or more other images may be displayed in other portions of the interactive display 20. Also, in the interactive mode, the interactive display 20 includes physical keys 28, such as, for example, bumps, ridges, indented regions or any other type of physical alteration that provides tactile feedback to a user, that correspond with the imaged keys 26 within the interactive keypad 22.

In FIG. 1B, the electronic device 1 is in a non-interactive mode. In this mode, the interactive keypad 22 is not displayed within the interactive display 20 and one or more other images may fully occupy the interactive display 20. Also, in the non-interactive mode, the interactive display 20 may be automatically modified so as not to include the physical keys 28 (i.e., the interactive display 20 may be completely smooth). Alternatively, the physical keys 28 may be formed permanently within the interactive display 20. A switch (not shown) may be provided through the housing 10 to allow a user to alternate the electronic device 1 between the interactive mode and the non-interactive mode.

Figure 2:
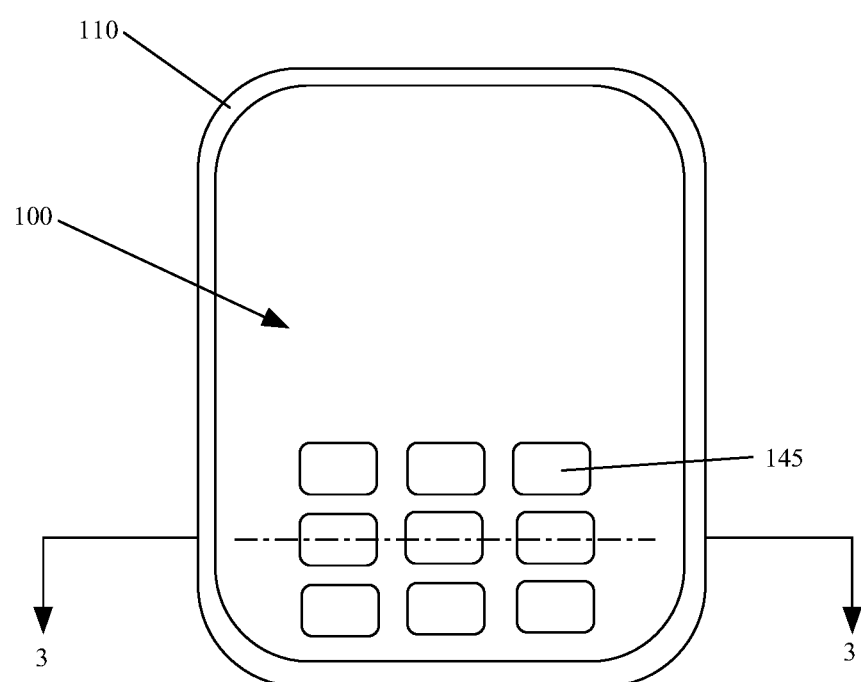
FIG. 2 is a plan view of an interactive display according to an exemplary embodiment of the present invention.

FIG. 2 is a plan view of an interactive display, generally designated by reference number 100, according to an exemplary embodiment of the present invention. The interactive display 100 is shown held within a frame element 110. The interactive display may include one or more physical keys 145. As explained in further detail below, the top surface of the physical keys 145 may be level with the top plane of the interactive display 100 when the interactive display 100 is in the non-interactive mode, and the top surface of the keys 145 may be moved outside the top plane of the interactive display 100 when the interactive display 100 is in the interactive mode so that bumps or protrusions are formed in the interactive display 100 that correspond with displayed imaged keys.

Figure 3A:
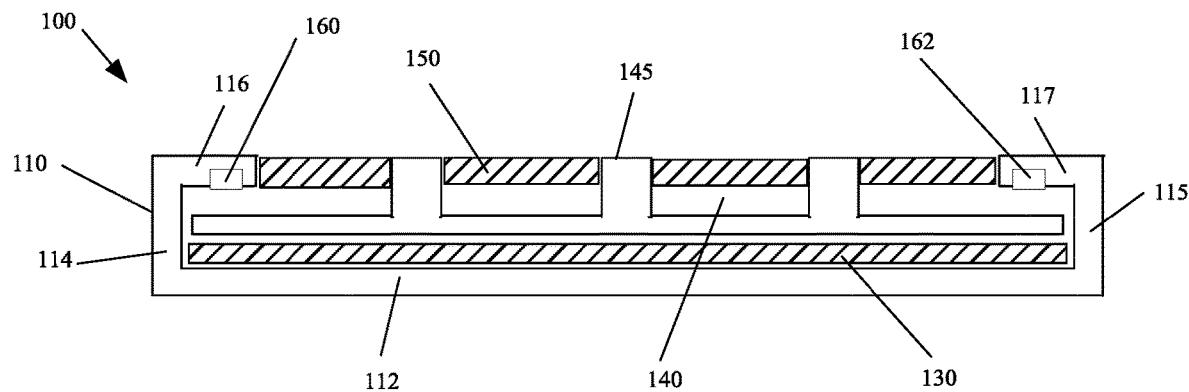
FIGS. 3A and 3B are cross-sectional views of an interactive display according to an exemplary embodiment of the present invention.
Figure 3B:
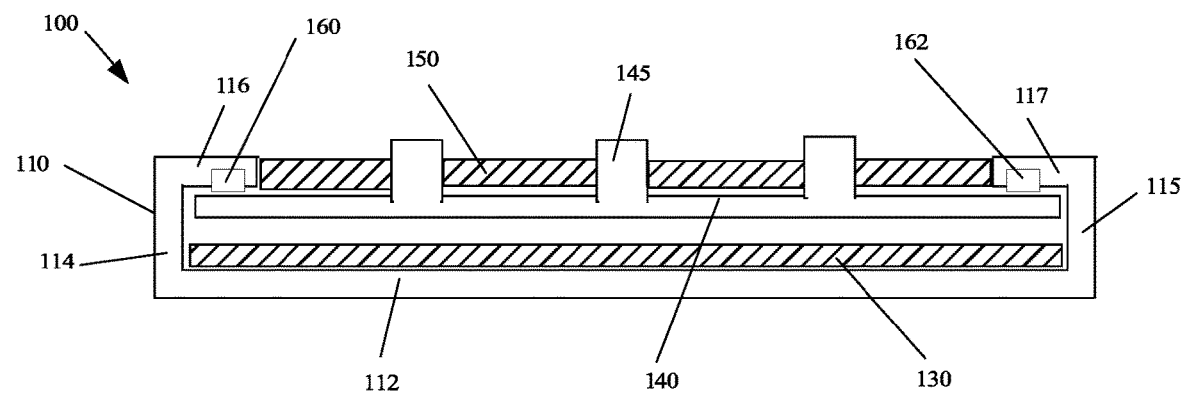

FIGS. 3A and 3B are cross-sectional views of the interactive display 100 taken along line 3-3 in FIG. 2. In FIG. 3A, the interactive display 100 is in the non-interactive mode, and in the FIG. 3B, the interactive display 100 is in the interactive mode. As shown in FIGS. 3A and 3B, the frame element 110 may include a bottom wall 112, side walls 114, 115 and top walls 116, 117. The interactive display 100 may be housed within the frame element 110 with the bottom surface of the interactive display 100 resting on the bottom wall 112 of the frame element 110. The interactive display 100 may include a display device 130, a physical keypad 140 including the physical keys 145 disposed over the display device 130, and a touchscreen panel 150 disposed over the physical keypad 140.

The display device 130 may be any suitable display device, such as, for example, a liquid crystal display (LCD), a digital light processing (DLP) display, a plasma display or a light-emitting diode (LED) display, to name a few. As is known in the art, the display device 130 may include programmable elements that emit and/or block light to generate images. In the present embodiment, the display device 130 may display an imaged keyboard when the interactive display 100 is in the interactive mode.

The physical keypad 140 is a generally flat sheet or plate. The physical keys 145 are formed on the top surface of the physical keypad 140, and extend upwards towards the touchscreen panel 150. The physical keypad 140 is preferably made of a transparent material, such as, for example, plastic or glass. Any number of physical keys 145 may be formed on the physical keypad 140. In an exemplary embodiment, the number and shape of the physical keys 145 are made to correspond to the number and shape of the imaged keys in the imaged keyboard displayed by the display device 130.

The touchscreen panel 150 may be a transparent panel that generates a programming signal when pressure is applied to one or more areas on the touchscreen panel 150. Various programming signals generated by the touchscreen panel 150 may be sent to the display device 130, resulting in formation or manipulation of images in the display device 130. For example, a user may apply pressure to the touchscreen panel 150 to activate the imaged keyboard and place the interactive display 100 in the interactive mode. Any suitable touchscreen technology may be used for the touchscreen panel 150, such as, for example, resistive touchscreens, surface acoustic wave touchscreens, capacitive touchscreens, infrared touchscreens, strain gauge touchscreens, optical imaging, dispersive signal technology, acoustic pulse recognition, total internal reflection, and diffused laser imaging, to name a few.

The touchscreen panel 150 may include a number of openings 152 that correspond with the physical keys 145 of the physical keypad 140. The physical keys 145 extend through the openings 152. When the interactive display 100 is in the non-interactive mode, the top surfaces of the physical keys 145 may be co-planar with the top surface of the touchscreen panel 150. When the interactive display 100 is in the interactive mode, the top surfaces of the physical keys 145 may be raised or lowered relative to the top surface of the touchscreen panel 150, so that the touchscreen panel 150 includes a number of protrusions or indentations that correspond to the imaged keys in the imaged keypad. Thus, when the interactive display 100 is in the interactive mode, a user is able to feel the location of the various imaged keys based on the tactile feedback provided by the protrusions or indentations in the touchscreen panel 150.

In an exemplary embodiment of the present invention, first and second actuators 160, 162, located on either side of the frame element 110, may be used to manipulate the physical keypad 140 and thereby raise and lower the physical keys 145 relative to the touchscreen panel 150. The first and second actuators 160, 162 may be any suitable actuators, such as, for example, mechanical actuators, such as springs, microelectromechanical devices (MEMS), piezoelectric actuators and magnetostrictive actuators, to name a few. It should be appreciated that the number of actuators is not limited to two, and any number of actuators located at any suitable position relative to the physical keypad 140 may be used to raise and lower the physical keypad 140. Alternatively, the actuators 160, 162 may be used to raise and lower the touchscreen panel 150 rather than the physical keypad 140.

In various exemplary embodiments of the present invention, the physical keys in the physical keypad may all be connected to the physical keypad so as to form a unitary structure, with no independent movement of the physical keys. Alternatively, each physical key may be independently moveable relative to the physical keypad and the other physical keys so that each physical key may have the ability to be physically "pressed" by a user. In this regard, each physical key may include, for example, a spring mechanism or may itself be made of a resilient material that is able to flex under pressure from a user's finger/thumb. The physical keypad may also use conventional keypad technology, such as, for example, dome-switch keypad technology, so that manipulation of each physical key results in a corresponding function.

Figure 4A:
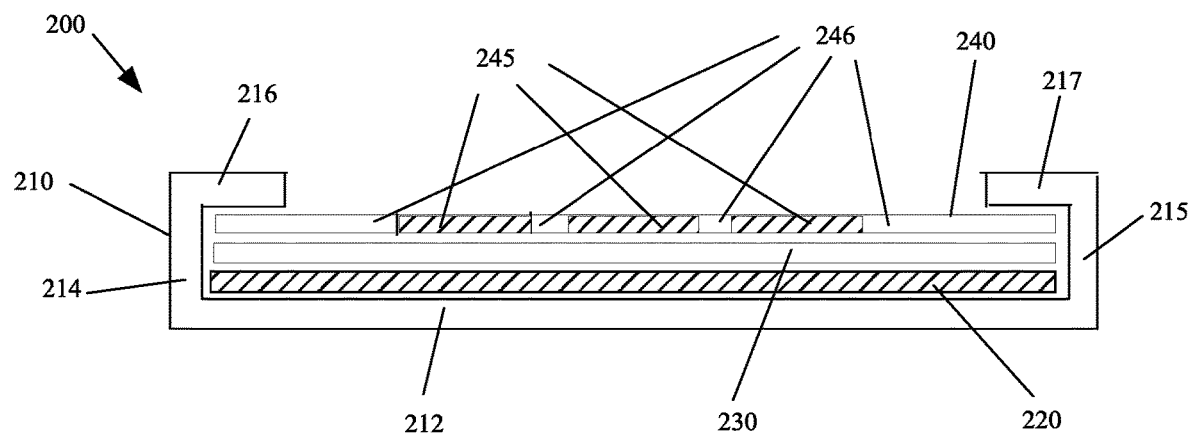
FIGS. 4A and 4B are cross-sectional views of an interactive display according to another exemplary embodiment of the present invention.
Figure 4B:
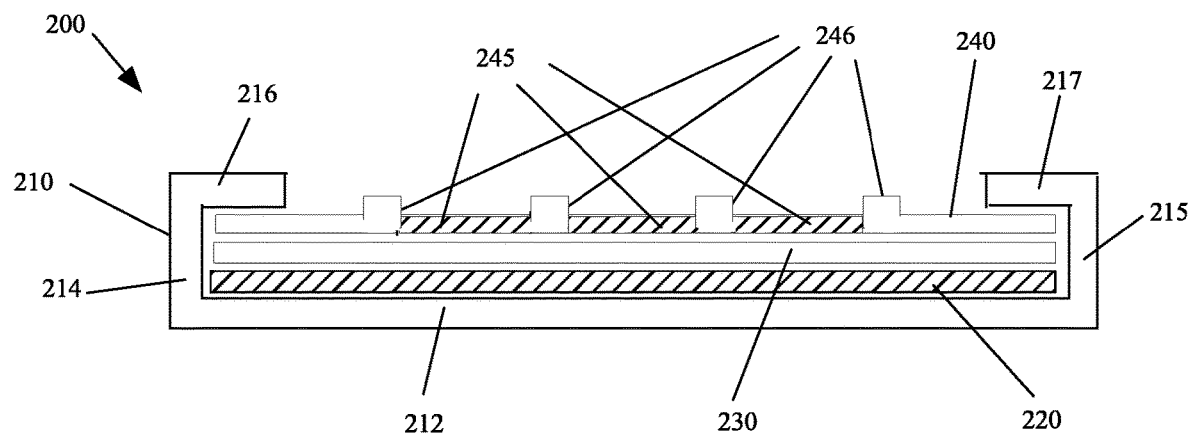

FIGS. 4A and 4B are cross sectional views of an interactive display, generally designated by reference number 200, according to another exemplary embodiment of the present invention. In FIG. 4A, the interactive display 200 is in the non-interactive mode, and in the FIG. 4B, the interactive display 200 is in the interactive mode. As in the previous embodiment, the interactive display 200 may be housed within a frame element 210 including a bottom wall 212, side walls 214, 215 and top walls 216, 217. The interactive display 200 may includes a display device 220, a touchscreen panel 230 disposed over the display device 220, and a physical keypad 240 disposed over the touchscreen panel 230. As in the previous embodiment, the display device 220 may be, for example, an LCD display, a DLP display, a plasma display or a LED display. The touchscreen panel 230 may use any of the touchscreen technology as described regarding the previous embodiment.

The physical keypad 240 in the present embodiment may include physical keys 245 defined by a material that changes shape under the influence of an electric or magnetic field. For example, the physical keys 245 may be made of a piezoelectric material, such as, for example, quartz, or a magnetostrictive material, such as, for example, ferromagnetic thin films. In the embodiment shown in FIGS. 4A and 4B, the physical keys 245 are defined by a grid structure 246 of piezoelectric material formed within the physical keypad 240. Thus, the grid structure 246 may either deflect downwards or upwards under the application of an electric field, thereby forming protrusions or indentations around the physical keys 245. In the embodiment shown in FIG. 4B, the grid structure 246 is structured so as to deflect upwards when an electric field is applied, thereby forming protrusions that define the physical keys 245. Thus, in the interactive mode, the user is able to feel the location of the physical keys 245. Deformation of the physical keys 245 in this embodiment may also result in generation of electricity, which may be fed back to the interactive display 200 as a power source.

It should be appreciated that the present invention is not limited to the above described embodiments. For example, in other exemplary embodiments, each physical key may be made of two or more pieces of transparent material that are made to deflect relative to one another when the interactive display is switched between the interactive and non-interactive modes so as to form appropriate protrusions or indentations in the interactive display that demark the physical keys. In such an embodiment, an additional transparent layer may be disposed over the physical keypad, so that when the two or more pieces of material that form the physical keys are deflected, smooth bumps or indentations are formed in the transparent layer.

Figure 5:
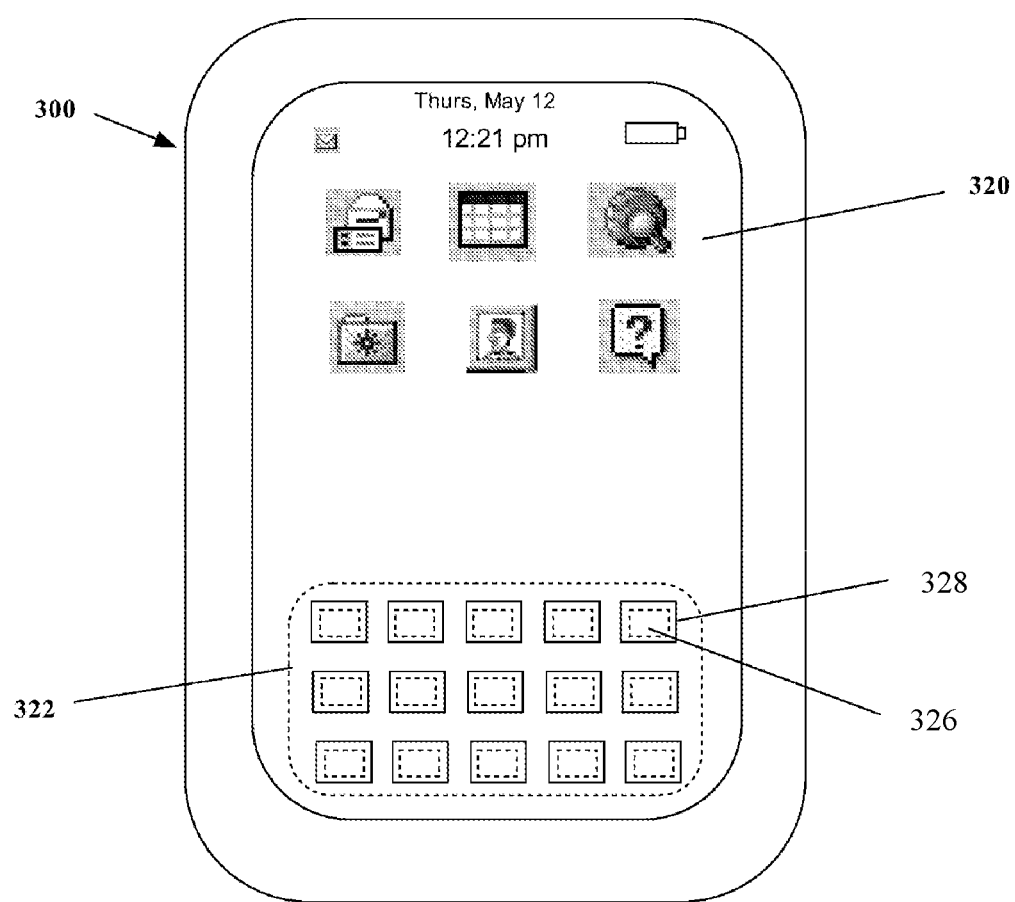
FIG. 5 is a plan view of an electronic device according to an exemplary embodiment of the present invention.
Figure 6A:
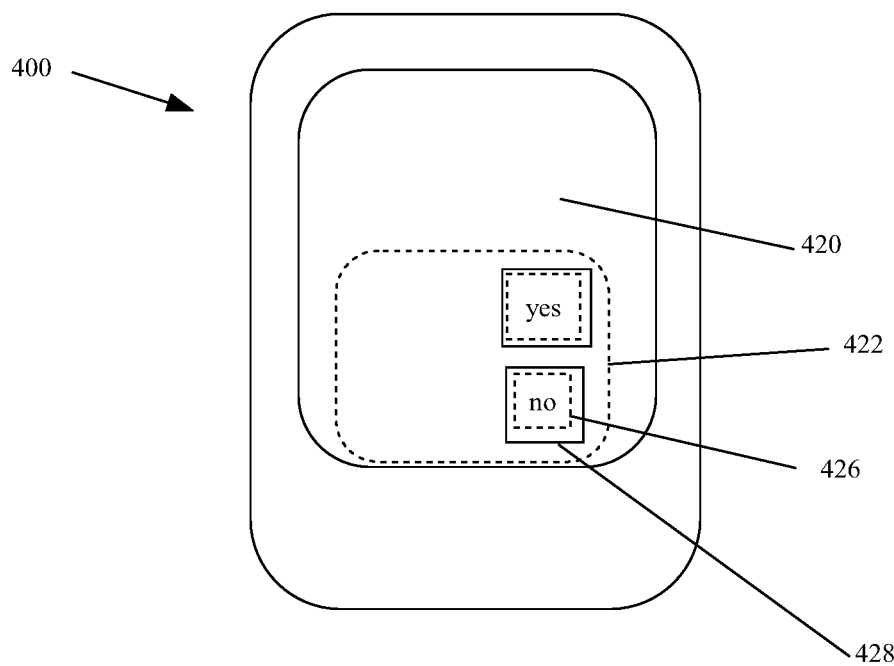
FIGS. 6A and 6B are plan views of an electronic device according to another exemplary embodiment of the present invention.
Figure 6B:
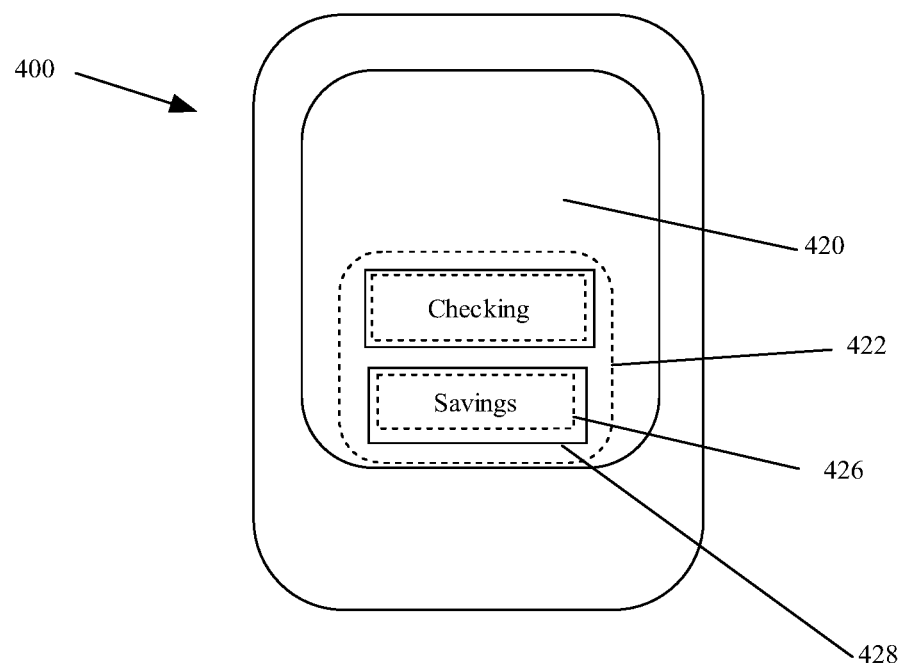

Further, as shown in FIGS. 5 and 6A-B, the interactive display of the present invention may include any number and shape of imaged and physical keys. In particular, in the embodiment shown in FIG. 5, an electronic device 300, such as a personal digital assistant, may include an interactive display 320 that provides a full keypad 322, including physical keys 328 corresponding with imaged keys 326, when in the interactive mode. In the embodiment shown in FIGS. 6A and 6B, an electronic device 400, such as an ATM, may include an interactive display 420 that provides a partial keypad 422, including physical keys 428 corresponding with imaged keys 426, when in the interactive mode. In the case of ATMs, the imaged keys 426 may be displayed in various shapes. For example, as shown in FIG. 6A, the electronic device 400 may display imaged keys 426 that are generally square shaped, while in FIG. 6B the electronic device 400 may display imaged keys 426 that are generally rectangular shaped. The physical keys 428 of the electronic device 400 may be made to mirror the different shapes of the imaged keys 426. In this regard, controlled magnetic and/or electric fields may be delivered to the physical keypad of the electronic device 400 to result in the appropriately shaped physical key 428.

In other exemplary embodiments of the present invention, the interactive display may include separate regions, where one or more regions are interactive and one or more other regions are not interactive. Further, the interactive display may be composed of more than one display, where one or more of the displays are interactive and one or more other displays are not interactive.

Figure 7:
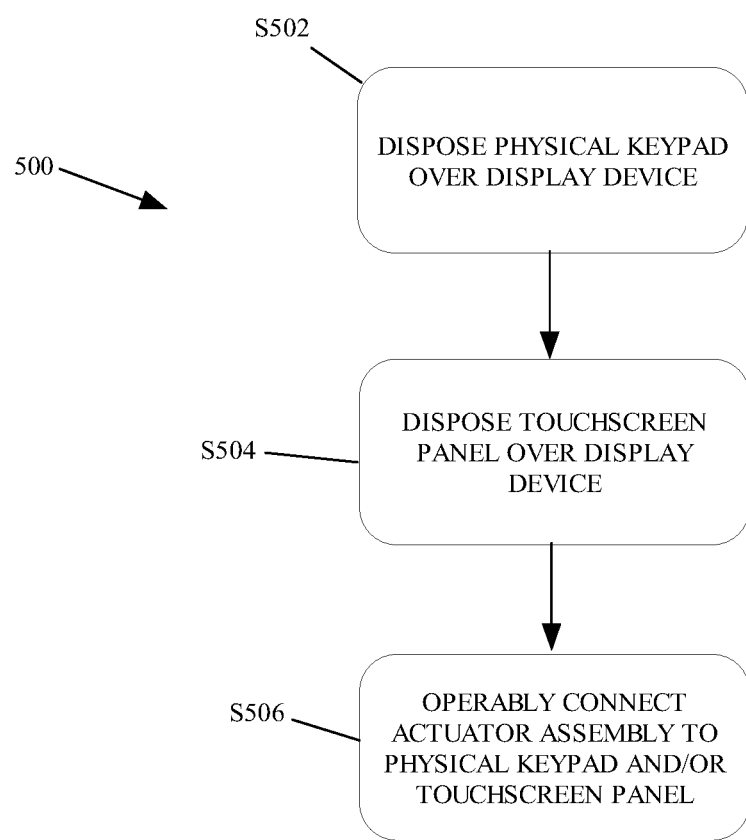
FIG. 7 is a flowchart showing a method of manufacturing an interactive display according to an exemplary embodiment of the present invention.

FIG. 7 is a flowchart showing a method, generally designated by reference number 500, of manufacturing an interactive display according to an exemplary embodiment of the present invention. In the present method, various layers of the interactive display may be disposed over one another and adhered to one another to provide a unitary structure. For example, one or more of the various layers may be laminated to one another. In step S502, a physical keypad having physical keys is disposed over a display device. The display device may be any suitable display device, such as, for example, an LCD display, a DLP display or a LED display, to name a few. The physical keypad may include, for example, permanent physical keys or be constructed of material that results in generation of temporary physical keys upon application of an electric or magnetic field to the physical keypad. In step S504, a touchscreen panel is disposed over the display device. The touchscreen panel may have one or more openings through which physical keys of the physical keypad may protrude. In step S506 an actuator assembly is operably attached to the physical keypad and/or the touchscreen panel. The actuator assembly may be controlled to deliver an appropriate magnetic or electric field to the physical keypad so as to generate temporary physical keys. Alternatively, the physical keypad and the touchscreen panel may be movable relative to one another through control of the actuator assembly, in which case the actuator assembly may include any suitable actuator that provides translation forces, such as, for example, springs, MEMS devices, and piezoelectric actuators, to name a few.

Figure 8:
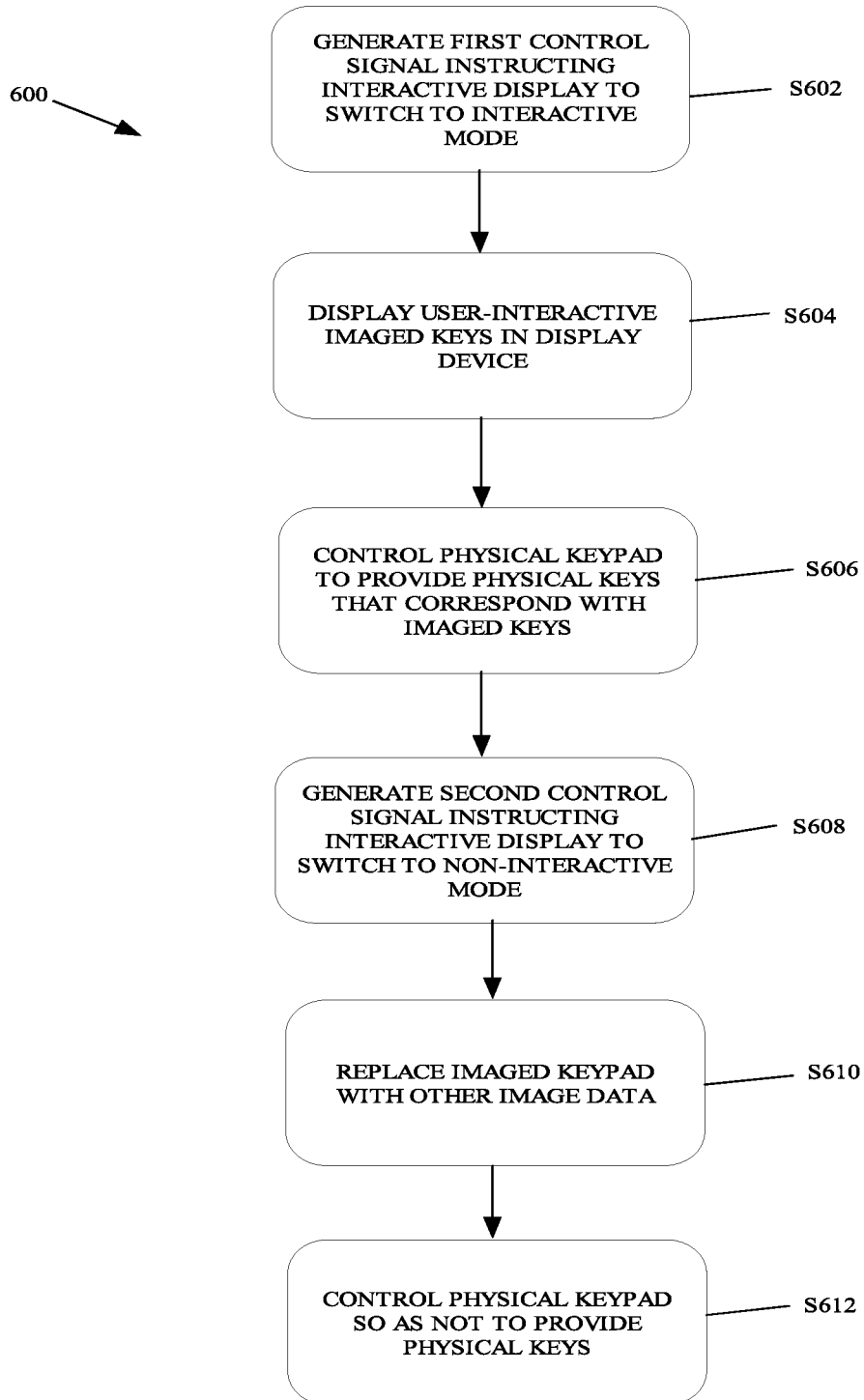
FIG. 8 is a flowchart showing a method of operation of an interactive display according to an exemplary embodiment of the present invention.

FIG. 8 is a flowchart showing a method of operation, generally designated by reference number 600, of an interactive display according to an exemplary embodiment of the present invention. In step S602, the interactive display generates a first control signal instructing the interactive display to switch into an interactive mode. In step S604, based on the second control signal, a display device of the interactive display displays user-interactive imaged keys of an imaged keypad. In step S606, based on the first control signal, a physical keypad of the interactive display is controlled to provide physical keys that correspond with the imaged keys of the imaged keypad. In step S608, the interactive display generates a second control signal instructing the interactive display to switch into a non-interactive mode. In step S610, based on the second control signal, the display device replaces the imaged keypad with other image data. In step S612, based on the second control signal, the physical keypad of the interactive display is controlled so as not to provide physical keys.

Figure 9:
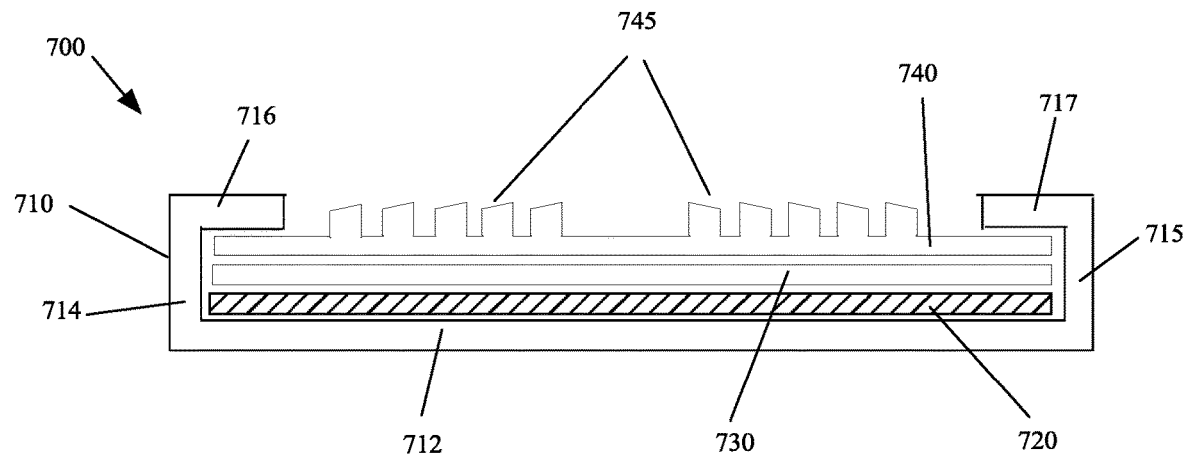
FIG. 9 is a cross-sectional view of an interactive display according to an exemplary embodiment of the present invention

FIG. 9 is a cross sectional views of an interactive display, generally designated by reference number 700, according to another exemplary embodiment of the present invention. As in the previous embodiment, the interactive display 700 may be housed within a frame element 710 including a bottom wall 712, side walls 714, 715 and top walls 716, 717. The interactive display 700 may includes a display device 720, a touchscreen panel 730 disposed over the display device 720, and a physical keypad 740 disposed over the touchscreen panel 730. As in the previous embodiment, the display device 720 may be, for example, an LCD display, a DLP display, a plasma display or a LED display. The touchscreen panel 730 may use any of the touchscreen technology as described regarding the previous embodiment.

The physical keypad 740 in the present embodiment may include physical keys 245. The physical keys 745 are preferably transparent and may be integrally formed with the remaining portions of the physical keypad 740 by a molding operation. In the exemplary embodiment shown in FIG. 9, the physical keys 245 protrude outwards away from the display device 720. However, in other exemplary embodiments, the physical keys 245 may protrude inwards towards the display device 720.

As shown in FIG. 9, the physical keys 745 on the right side of the physical keypad 740 may include top surfaces that are inclined towards the right, and the physical keys 745 on the left side of the physical keypad 740 may include top surfaces that are inclined towards the left. This arrangement prevents a user's finger from sliding off a physical key 745 onto an adjacent physical key 745. There may also be additional space provided between the left side physical keys 745 and right side physical keys 745 to allow for better viewing of the image when the interactive display 700 is in the non-interactive mode.

Figure 10:
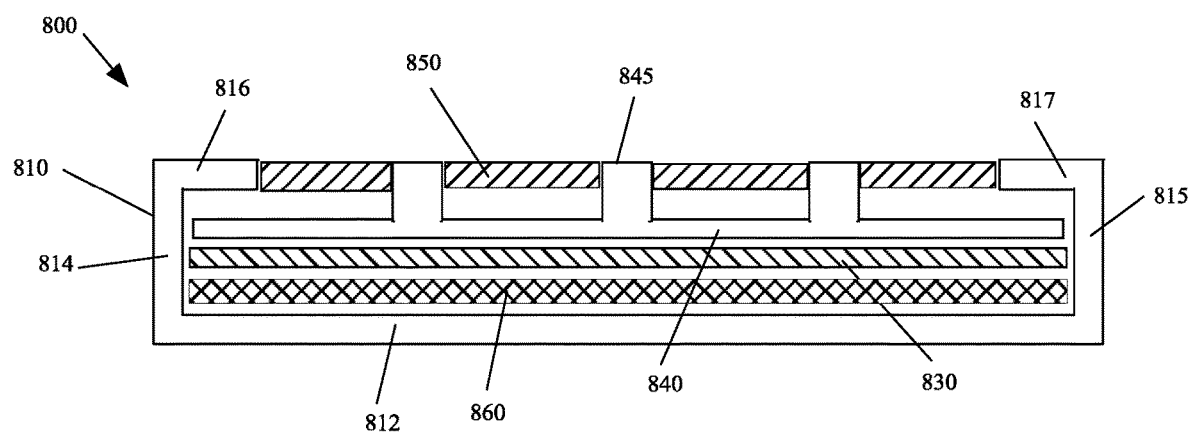
FIG. 10 is a cross-sectional view of an interactive display according to an exemplary embodiment of the present invention.

FIG. 10 is a cross sectional views of an interactive display, generally designated by reference number 800, according to another exemplary embodiment of the present invention. As in the previous embodiments, the interactive display 800 may be housed within a frame element 810 including a bottom wall 812, side walls 814, 815 and top walls 816, 817. The interactive display 800 may includes a display device 830, a physical keypad 840 disposed over the display device 830, and a touchscreen panel 850 disposed over the physical keypad 840. The physical keys 845 of the physical keypad 840 may protrude through openings in the touchscreen panel 850 when the interactive display 800 is in the interactive mode. As in the previous embodiments, the display device 830 may be, for example, an LCD display, a DLP display, a plasma display or a LED display. The touchscreen panel 850 may use any of the touchscreen technology as described regarding the previous embodiments.

In the present embodiment, an actuator element 860 is disposed below the display device 830. The actuator element 860 may be any type of suitable actuator, such as, for example, piezoelectric actuators or magnetostrictive actuators. It should be appreciated that the number of actuators is not limited to one, and any number of actuators located at any suitable position relative to the physical keypad 840 may be used to raise and lower the physical keypad 845. Alternatively, the actuator element 860 may be used to raise and lower the touchscreen panel 850 rather than the physical keypad 840. The structure of the present embodiment allows the display device 830 to be sealed with the frame element 810 so as to protect the actuator element 860 and other internal components from being damaged.

Figure 11:
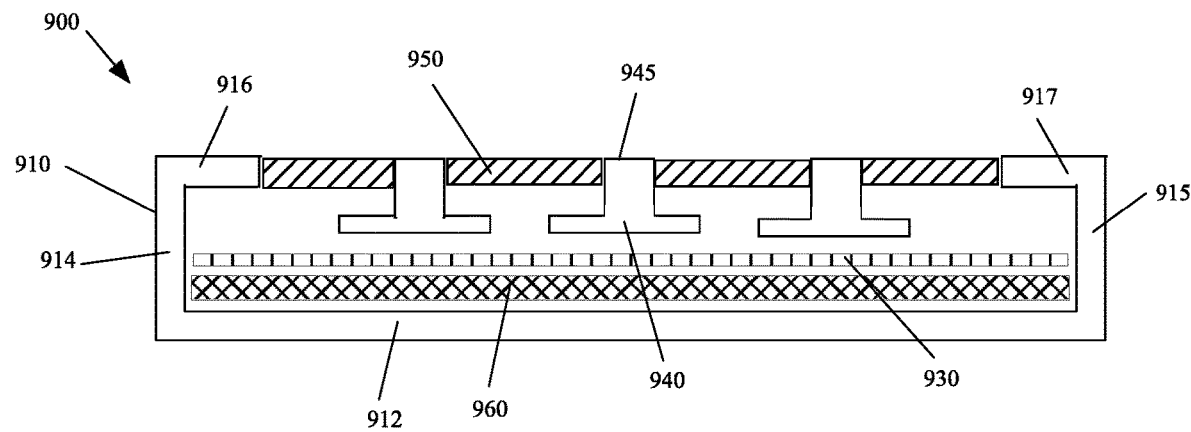
FIG. 11 is a cross-sectional view of an interactive display according to an exemplary embodiment of the present invention.

FIG. 11 is a cross sectional views of an interactive display, generally designated by reference number 900, according to another exemplary embodiment of the present invention. As in the previous embodiments, the interactive display 900 may be housed within a frame element 910 including a bottom wall 912, side walls 914, 915 and top walls 916, 917. The interactive display 900 may include an actuator element 960, a protective layer 930 disposed over the actuator element 960, one or more sub-keypads 940 disposed over the protective layer 930, and a touchscreen display device 950 disposed over the sub-keypads 940. The use of the touchscreen display device 950 eliminates the need for a separate touchscreen panel, as in previous embodiments. The sub-keypads 940 may be individually operated by the actuator element 960, so that different ones of the physical keys 940 may be made to protrude through openings in the touchscreen display device 950. Thus, as an example, different physical keys 940 may provide tactile feedback to a user depending on the functional mode of the interactive display 900. Although each sub-keypad 940 is shown in FIG. 11 having only one physical key 945, it should be appreciated that each sub-keypad 940 may have any number of physical keys 945.

The protective layer 930 is disposed between the sub-keypads 940 and the actuator element 960 so as to prevent damage to the actuator element 960 that may otherwise result from contact with the sub-keypads 940. The protective layer 930 may be made of any suitable protective material that does not interfere with the function of the actuator element 960, such as, for example, felt, cotton, plastic, insulators, cushioning material, etc. The protective material can even be air in one embodiment.

FIG. 11 is a cross sectional views of an interactive display, generally designated by reference number 1000, according to another exemplary embodiment of the present invention. As in the previous embodiments, the interactive display 1000 may be housed within a frame element 1010 including a bottom wall 1012, side walls 1014, 1015 and top walls 1016, 1017. The interactive display 1000 may include an actuator element 1060, a physical keypad 1040 disposed over the actuator element 1060, and a touchscreen display device 1030 disposed over the physical keypad 1040. As in the previous embodiment, the physical keypad 1040 may be made up of separate sub-keypads (not shown). Further, a protective layer (not shown) may be disposed between the physical keypad 1040 and the actuator element 1060.

In the present embodiment, each key 1045 of the physical keypad 1040 forms part of the touchscreen display device 1030. In this regard, a touchscreen display element 1048 may be disposed within each key 1045, so that images, such as corresponding imaged keys, may be displayed on each key 1045 as part of the overall image displayed by the touchscreen display device 1030.

Figure 12A:
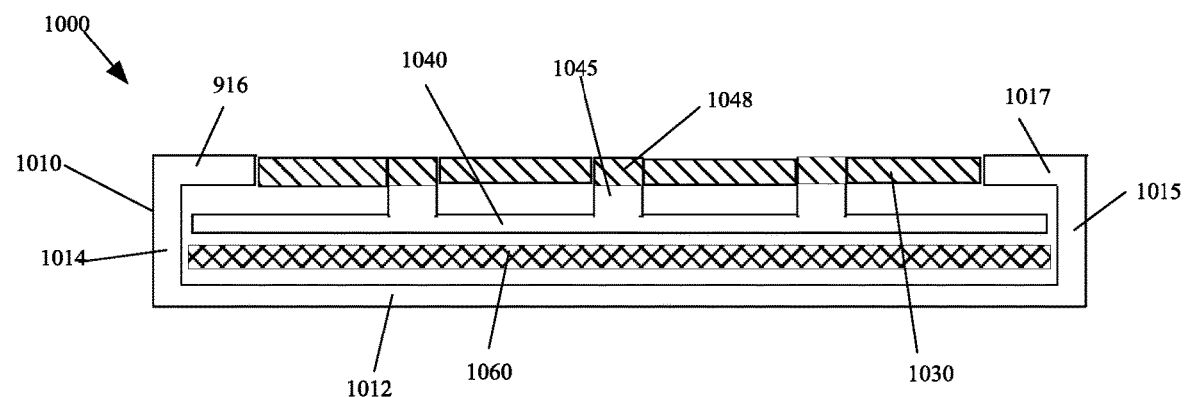
FIG. 12A is a cross-sectional view of an interactive display according to an exemplary embodiment of the present invention.
Figure 12B:
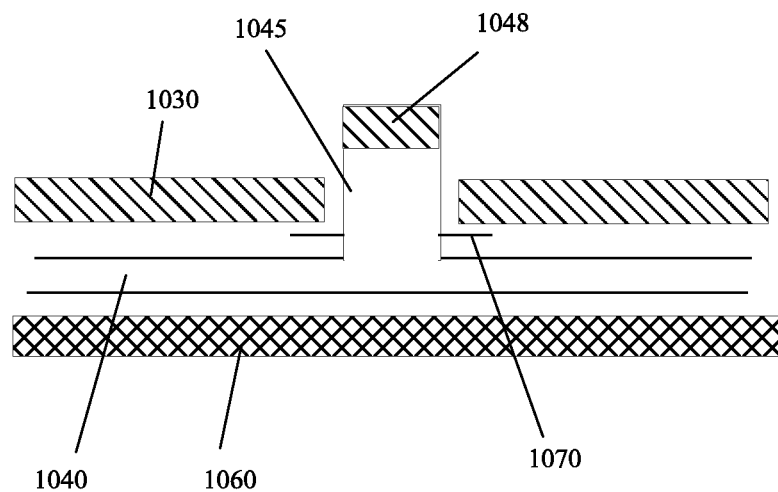
FIG. 12B is a detailed cross-sectional view of a section of the interactive display shown in FIG. 12A.

FIG. 12B is a detailed cross-sectional view of a section of the interactive display 1000. As shown in this figure, a connective element 1070 may be disposed at the base of each key 1045 so as to provide for delivery of appropriate signals to the key 1045 to display an image within the corresponding touchscreen display element 1048.

Figure 13:
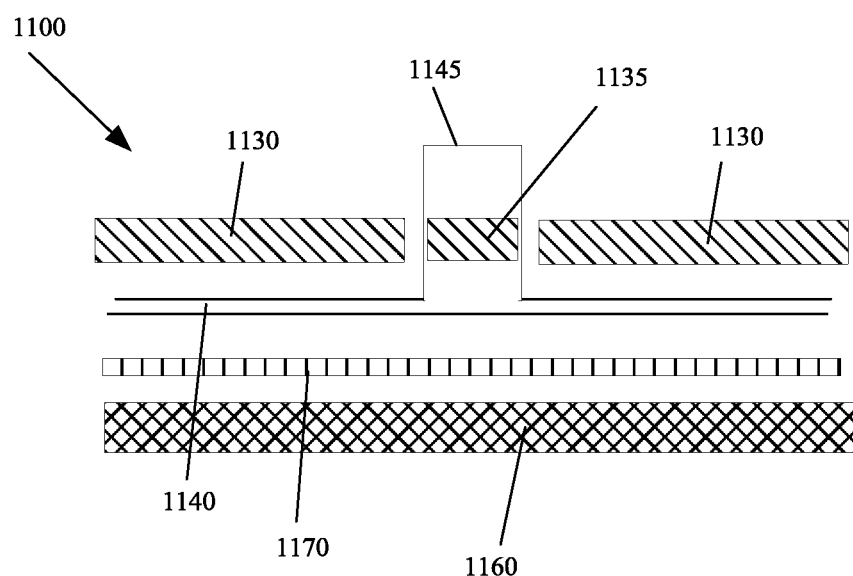
FIG. 13 is a cross-sectional view of an interactive display according to an exemplary embodiment of the present invention.

FIG. 13 is a cross-sectional view of a section of an interactive display, generally designated by reference number 1100, accordingly to another exemplary embodiment of the present invention. As in previous embodiment, the interactive display 1100 may be disposed within a frame element (not shown). The interactive display 1100 includes an actuator element 1160, a protective layer 1170 disposed over the actuator element 1160, a physical keypad 1140 disposed over the protective layer 1170 and a touchscreen display device 1130 disposed over the physical keypad 1140. A portion 1135 of the touchscreen display device 1130 may be disposed within each key 1145 of the physical keypad 1140. In this regard, the keys 1145 of the physical keypad 1140 may be substantially transparent, so that the portions 1135 of the touchscreen display device 1130 may be viewed through the top of each key 1145.

Figure 14A:
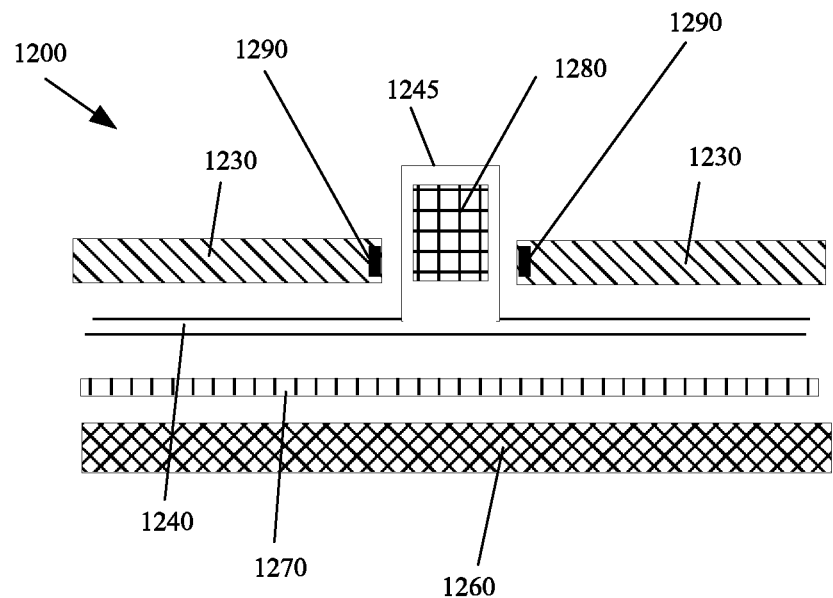
FIG. 14A is a cross-sectional view of an interactive display according to an exemplary embodiment of the present invention.
Figure 14B:
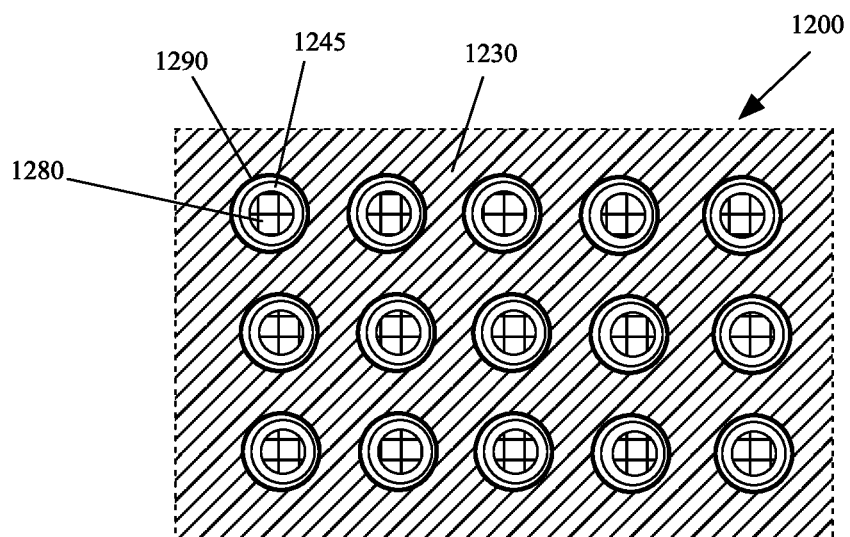
FIG. 14B is a plan view of the interactive display of FIG. 14A.

FIG. 14A is a cross-sectional view of a section of an interactive display, generally designated by reference number 1200, accordingly to another exemplary embodiment of the present invention. As in the previous embodiment, the interactive display 1200 may be disposed within a frame element (not shown). The interactive display 1200 includes an actuator element 1260, a protective layer 1270 disposed over the actuator element 1260, a physical keypad 1240 disposed over the protective layer 1270 and a touchscreen display device 1230 disposed over the physical keypad 1240. A permanent magnet 1280 is disposed within each key 1245 of the keypad 1240. One or more charged electrical circuit elements 1290 may be disposed within the touchscreen display device 1230 adjacent each key 1245. In an exemplary embodiment, the charged electrical circuit elements 1290 may be electromagnetic coils, and, as shown in FIG. 14B, the permanent magnets 1280 within each key 1245 may pass through a respective one of the electromagnetic coils. Movement of the key 1245, and hence the permanent magnet 1280, within a corresponding opening within the touchscreen display device 1230 relative to the charged electrical circuit elements 1290 results in generation of electricity. The movement of the keys 1245 may be due to switching of the interactive display between the interactive mode and the non-interactive mode, and may also result from user manipulation of the keys 1245. The generated electricity may be fed back to the interactive display 1200 as a power source.

FIGS. 15A-15D are various views of an electronic device, generally designated by reference number 2000, according to another exemplary embodiment of the present invention. In the present embodiment, the electronic device 2000 may be, for example, a PDA, cell phone, or other hand-held mobile device. The electronic device 2000 includes a housing 2010 and an interactive display 2020.

Figure 15A:
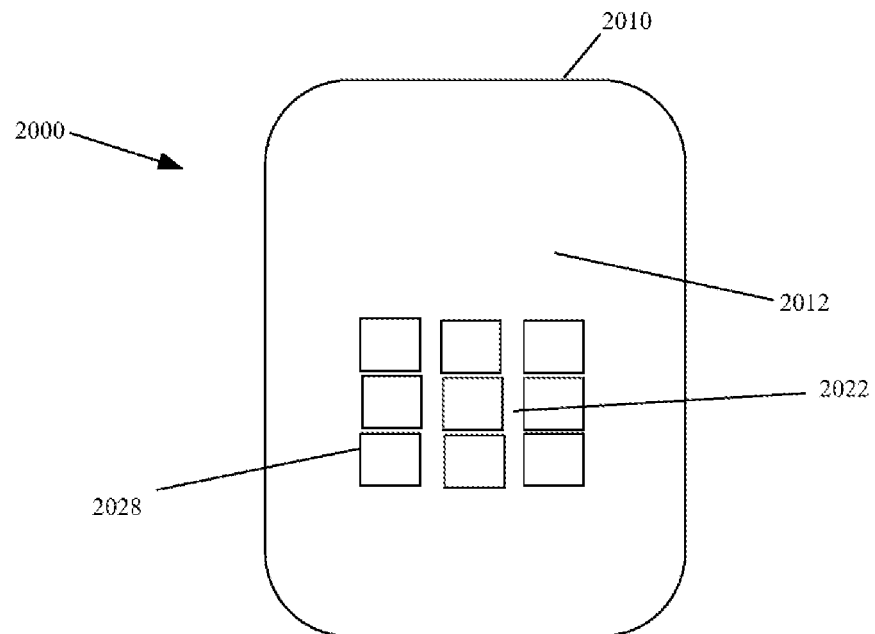
FIG. 15A is a back view of an electronic device according to an exemplary embodiment of the present invention.
Figure 15B:
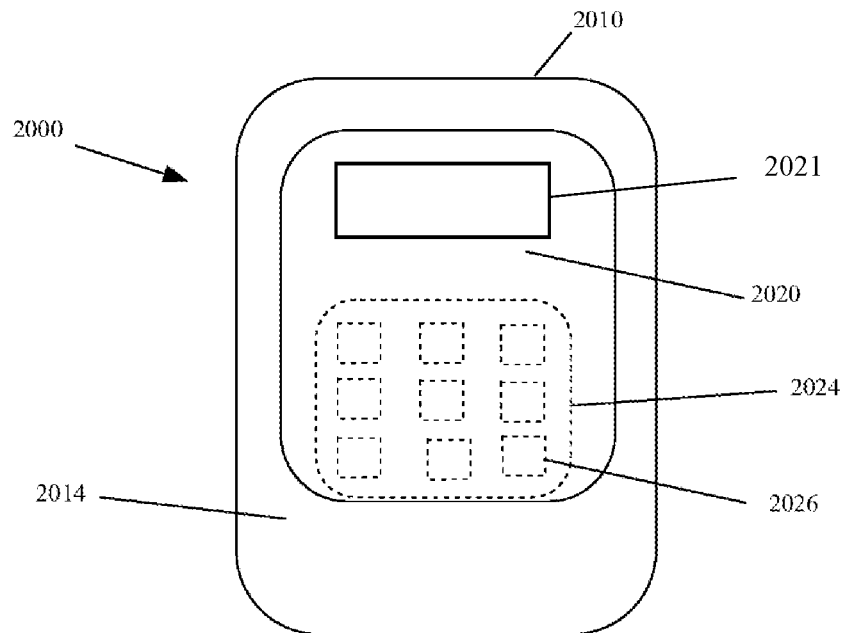
FIG. 15B is a front view of an electronic device according to an exemplary embodiment of the present invention.

FIGS. 15A and 15B show the electronic device 2000 in a keyboard-enabled mode. In particular, FIG. 15A is a back view of the electronic device 2000 in the keyboard-enabled mode, and FIG. 15B is a front view of the electronic device 2000 in the keyboard-enabled mode.

As shown in FIG. 15A, when the electronic device 2000 is switched to the keyboard-enabled mode, the back surface 2012 of the electronic device includes a physical keypad 2022 made up of physical keys 2028. As in previous embodiments, the physical keys 2028 may be formed by, for example, bumps, ridges, indented regions or any other type of physical alteration that provides tactile feedback to a user. At the same time, as shown in FIG. 15B, the interactive display 2020 disposed at the front surface 2014 of the electronic device 2000 may generate an imaged keypad 2024 made up of imaged keys 2026. However, it should be appreciated that, when the electronic device 2000 is in the keyboard-enabled mode, the imaged keypad 2024 need not be made available. For example, the interactive display 2020 may display other types of image data, such as, for example, selectable menus or moving video game images. In an exemplary embodiment, each of the imaged keys 2026 displayed on the front of the electronic device 2000 may correspond to a respective one of the physical keys 2028 disposed at the back of the electronic device 2000. In this regard, the imaged key 2026 corresponding to a pressed physical key 2028 may be shown as being activated, such as by, for example, illumination, change of size, or visual distortion of the corresponding imaged key 2026. Such an arrangement allows a user to "view" within the imaged keypad 2024 which physical keys 2028 are being pressed by the user, even though the physical keypad 2022 is disposed on the side of the electronic device 2000 that is actually out of view from the user.

In an alternative exemplary embodiment, the imaged keypad 2024 at the front of the electronic device 2000 and the physical keypad 2022 at the back of the electronic device 2000 together form a combination keypad made up of imaged keys 2026 and physical keys 2028, where the imaged keys 2026 perform functions different from those of the physical keys 2028. For example, the physical keys 2028 may include modifier keys, such as "control" and "shift" keys, lock keys, such as "num lock" and "caps lock", navigation keys, such as arrow keys, "page up/page down" and "home/end", and editing keys, such as "return", "enter", "backspace", "insert", "delete", "tab" and space bar, while the image keys 2026 may include alphanumeric keys. In other embodiments, this configuration may be reversed, so that the image keys 2026 include modifier, navigation, lock, editing and navigation keys, while the physical keys 2028 include alphanumeric keys. Also, in other embodiments, the imaged keys 2026 and physical keys 2028 may include any suitable arrangement of modifier, navigation, lock, editing and alphanumeric keys. The combination of imaged keys 2026 and physical keys 2028 having varying functions and disposed on opposite surfaces of the electronic device 2000 allows for the use of both thumbs and fingers to manipulate the keys. For example, the fingers on the underside of the electronic device 2000 may be used to input letters and numbers, while the thumbs on the top of the electronic device 2000 may be used to control spacing, paragraph changes, etc. The imaged keys 2026 and physical keys 2028 may be rearranged based on user preference, so that the user is able to choose which keys are available on different surfaces of the electronic device 2000. For example, the user may choose to arrange certain keys that are typically activated by the user's thumb on one surface of the electronic device 2000 and certain keys that are typically activated by the user's fingers on another surface.

Figure 15C:
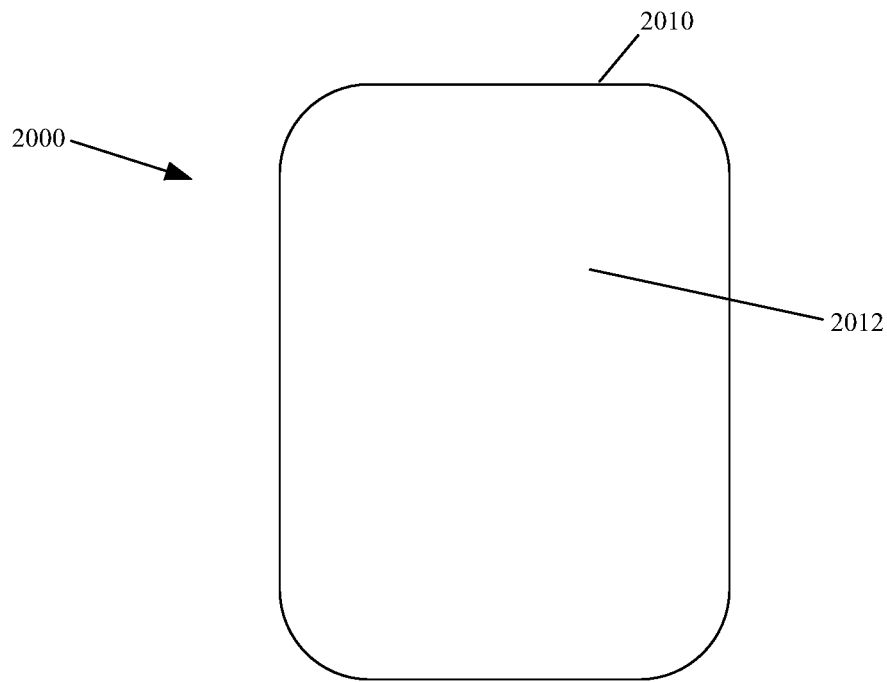
FIG. 15C is a back view of an electronic device according to an exemplary embodiment of the present invention.
Figure 15D:
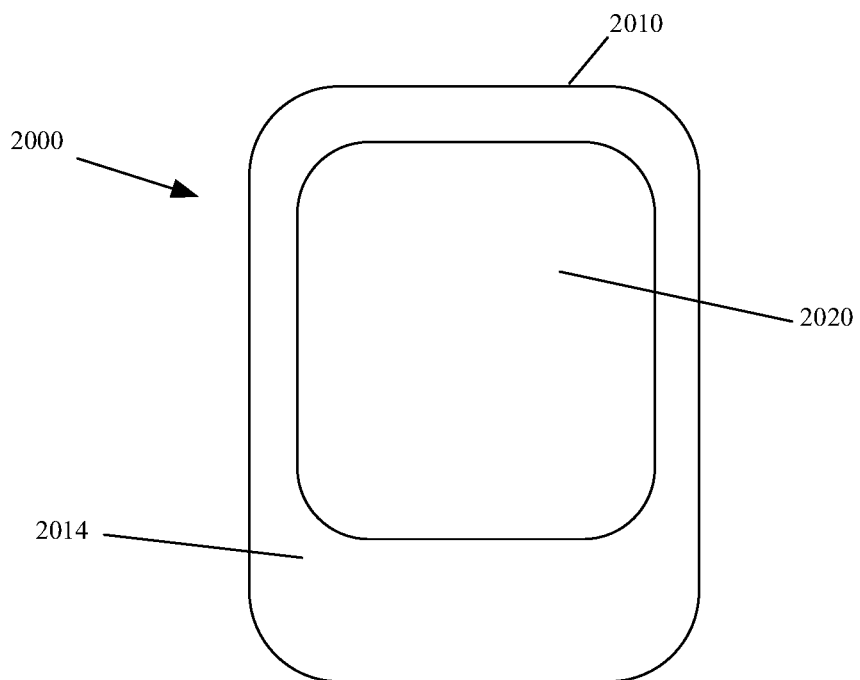
FIG. 15D is a front view of an electronic device according to an exemplary embodiment of the present invention.

FIGS. 15C and 15D show the electronic device 2000 in the keyboard-disabled mode. In particular, FIG. 15C is a back view of the electronic device 2000 in the keyboard-disabled mode, and FIG. 15D is a front view of the electronic device 2000 in the keyboard-disabled mode. In the keyboard-disabled mode, the physical keypad 2022 at the back surface 2012 is automatically modified so as not to include the physical keys 2028 (i.e., the physical keypad 2022 may be completely smooth). Alternatively, the physical keys 2028 may be formed permanently within the physical keypad 2022. Also, in the keyboard-disabled mode, the imaged keypad 2024 may not be displayed within the interactive display 2020 and one or more other images may fully occupy the interactive display 2020.

Figure 16A:
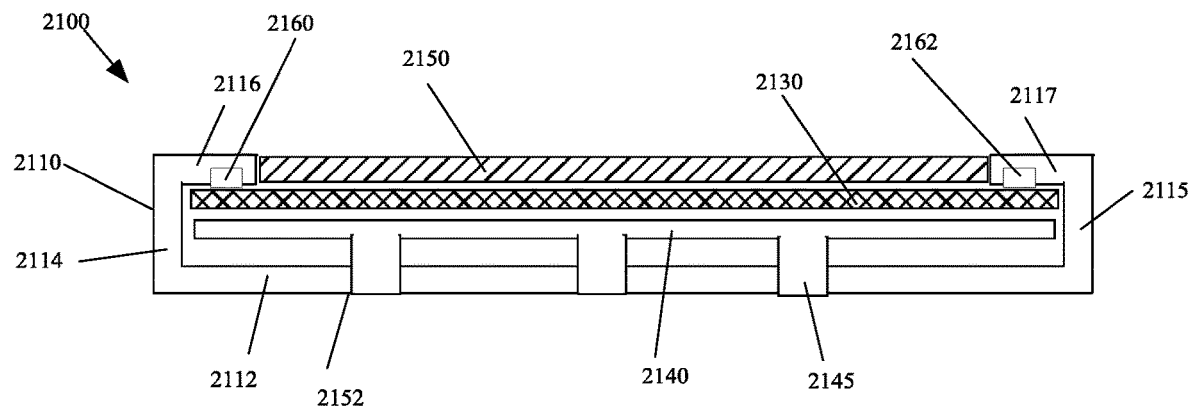
FIGS. 16A and 16B are cross-sectional views of an interactive display according to an exemplary embodiment of the present invention.
Figure 16B:
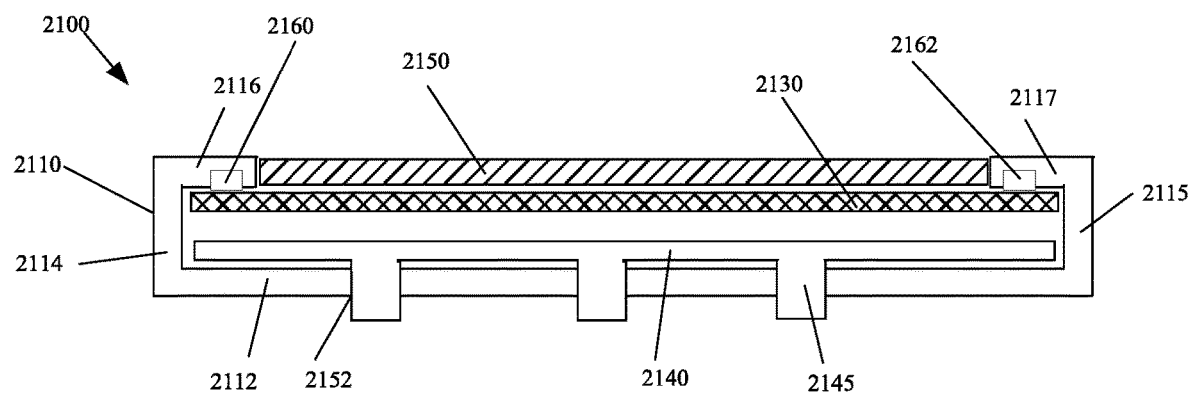

The physical keypad 2022 and imaged keypad 2024 may operate the same as in other exemplary embodiments of the present invention described herein, except that the physical keys 2028 provide tactile feedback to the user on a surface of the electronic device 2000 that is different from a surface on which the imaged keypad 2024 is displayed. For example, the physical keys 2028 may be automatically manipulated by actuators or through the use of material for the physical keys 2028 that changes shape under the influence of an electric or magnetic field. In this regard, FIGS. 16A and 16B are cross-sectional views of an interactive display 2100 according to another exemplary embodiment of the present invention. In FIG. 16A, the interactive display 2100 is in the keyboard-disabled mode, and in the FIG. 16B, the interactive display 2100 is in the keyboard-enabled mode. The interactive display 2100 may be housed within a frame element 2110 made up of a bottom wall 2112, side walls 2114, 2115 and top walls 2116, 2117. The interactive display 2100 may be housed within the frame element 2110 with the bottom surface of the interactive display 2100 resting on the bottom wall 2112 of the frame element 2110. The interactive display 2100 may include a physical keypad 2140 including physical keys 2145, a display device 2130 disposed over the physical keypad 2140, and a touchscreen panel 2150 disposed over the display device 2130.

The display device 2130 may be any suitable display device, such as, for example, a liquid crystal display (LCD), a digital light processing (DLP) display, a plasma display or a light-emitting diode (LED) display, to name a few. As is known in the art, the display device 2130 may include programmable elements that emit and/or block light to generate images. In the present embodiment, the display device 2130 may display an imaged keyboard when the interactive display 2100 is in the keyboard-enabled mode.

The physical keypad 2140 is a generally flat sheet or plate. The physical keys 2145 are formed on the top surface of the physical keypad 2140, and extend downwards towards the bottom wall 2112 of the frame element 2110. The physical keypad 2140 may be made of a transparent material, such as, for example, plastic or glass. Any number of physical keys 2145 may be formed on the physical keypad 2140. In an exemplary embodiment, the number and shape of the physical keys 2145 are made to correspond to the number and shape of the imaged keys in the imaged keyboard displayed by the display device 2130.

The touchscreen panel 2150 may be a transparent panel that generates a programming signal when pressure is applied to one or more areas on the touchscreen panel 2150. Various programming signals generated by the touchscreen panel 2150 may be sent to the display device 2130, resulting in formation or manipulation of images in the display device 2130. For example, a user may apply pressure to the touchscreen panel 2150 to activate the imaged keyboard and place the interactive display 2100 in the interactive mode. Any suitable touchscreen technology may be used for the touchscreen panel 2150, such as, for example, resistive touchscreens, surface acoustic wave touchscreens, capacitive touchscreens, infrared touchscreens, strain gauge touchscreens, optical imaging, dispersive signal technology, acoustic pulse recognition, total internal reflection, and diffused laser imaging, to name a few.

The bottom wall 2112 of the frame element 2110 may include a number of openings 2152 that correspond with the physical keys 2145 of the physical keypad 2140. The physical keys 2145 extend through the openings 2152. When the interactive display 2100 is in the keyboard-disabled mode, the top surfaces of the physical keys 2145 may be co-planar with the bottom surface of the bottom wall 2112. When the interactive display 2100 is in the keyboard-enabled mode, the top surfaces of the physical keys 2145 may be raised or lowered relative to the top surface of the bottom wall 2112, so that the bottom wall 2112 includes a number of protrusions or indentations that correspond to the imaged keys in the imaged keypad. Thus, when the interactive display 2100 is in the keyboard-enabled mode, a user may be able to feel the location of the various imaged keys based on the tactile feedback provided by the protrusions or indentations in the bottom wall 2112.

In an exemplary embodiment of the present invention, first and second actuators 2160, 2162, located on either side of the frame element 2110, may be used to manipulate the physical keypad 2140 and thereby raise and lower the physical keys 2145 relative to the bottom wall 2112. The first and second actuators 2160, 2162 may be any suitable actuators, such as, for example, mechanical actuators, such as springs, microelectromechanical devices (MEMS), piezoelectric actuators and magnetostrictive actuators, to name a few. It should be appreciated that the number of actuators is not limited to two, and any number of actuators located at any suitable position relative to the physical keypad 2140 may be used to raise and lower the physical keypad 2140.

Figure 17A:
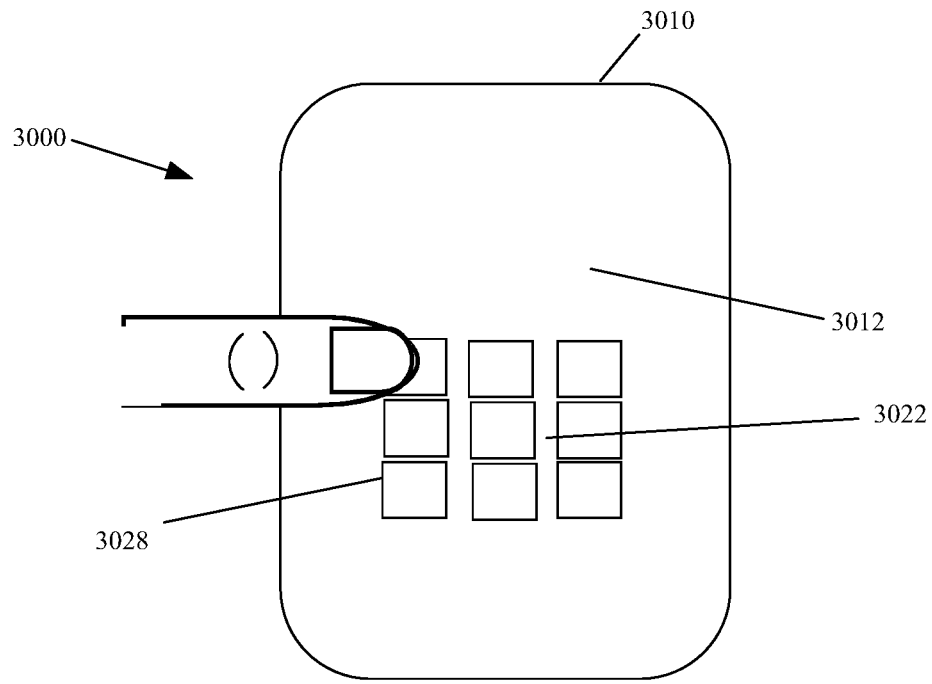
FIG. 17A is a back view of an electronic device according to an exemplary embodiment of the present invention.
Figure 17B:
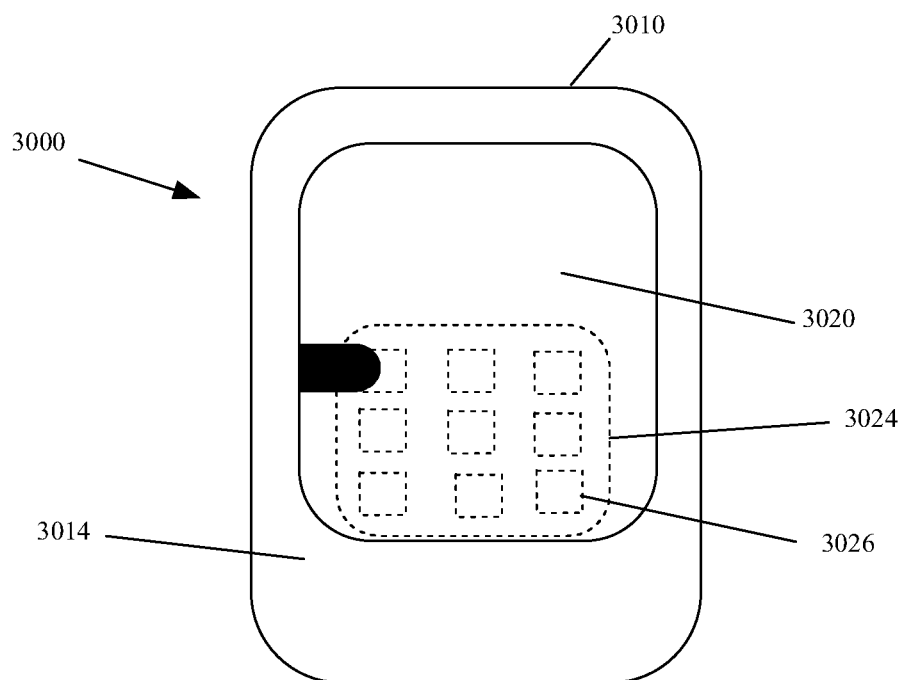
FIG. 17B is a front view of an electronic device according to an exemplary embodiment of the present invention.

FIGS. 17A-17B are various views of an electronic device, generally designated by reference number 3000, according to another exemplary embodiment of the present invention. In the present embodiment, the electronic device 3000 may be, for example, a PDA, cell phone, or other hand-held mobile device. The electronic device 3000 includes a housing 3010 and an interactive display 3020. The electronic device 3000 may have structural components that are the same as those of the electronic device 2000 of the previous embodiment, except for additional components as described below that allow a user to view the motion of the user's fingers or thumbs underneath the electronic device 3000.

FIGS. 17A and 17B show the electronic device 3000 in the keyboard-enabled mode. In particular, FIG. 17A is a back view of the electronic device 3000 in the keyboard-enabled mode, and FIG. 17B is a front view of the electronic device 3000 in the keyboard-enabled mode. As shown in FIG. 17A, when the electronic device 3000 is switched to the keyboard-enabled mode, the back surface 3012 of the electronic device includes a physical keypad 3022 made up of physical keys 3028. As in previous embodiments, the physical keys 3028 may be formed by, for example, bumps, ridges, indented regions or any other type of physical alteration that provides tactile feedback to a user. At the same time, as shown in FIG. 17B, the interactive display 3020 disposed at the front surface 3014 of the electronic device 3000 may generate an imaged keypad 3024 made up of imaged keys 3026. However, it should be appreciated that, when the electronic device 3000 is in the keyboard-enabled mode, the imaged keypad 3024 need not be made available. For example, the interactive display 3020 may display other types of image data, such as, for example, selectable menus or moving video game images. In an exemplary embodiment, each of the imaged keys 3026 displayed on the front of the electronic device 3000 may correspond to a respective one of the physical keys 3028 disposed at the back of the electronic device 3000. In this regard, the imaged key 3026 corresponding to a pressed physical key 3028 may be shown as being activated, such as by, for example, illumination, change of size, or visual distortion of the corresponding imaged key 3026. Such an arrangement allows a user to "view" within the imaged keypad 3024 which physical keys 3028 are being pressed by the user, even though the physical keypad 3022 is disposed on the side of the electronic device 3000 that is actually out of view from the user. Also, in the present embodiment, as the user moves his thumb/finger over the physical keys 3028, an imaged representation 3030 of the user's thumb/finger is displayed within the imaged keypad 3024, or if the imaged keypad 3024 is not displayed, the imaged representation 3030 may be shown relative to other displayed image data within the interactive display 3020. The imaged representation 3030 may be a silhouette of the thumb/finger, as shown in FIG. 17B, or any other suitable representation, such as, for example, "blurred" or shadowed spots moving across the imaged keypad 3024 that follow the movement of the user's fingertips within the physical keypad 3022.

Figure 18A:
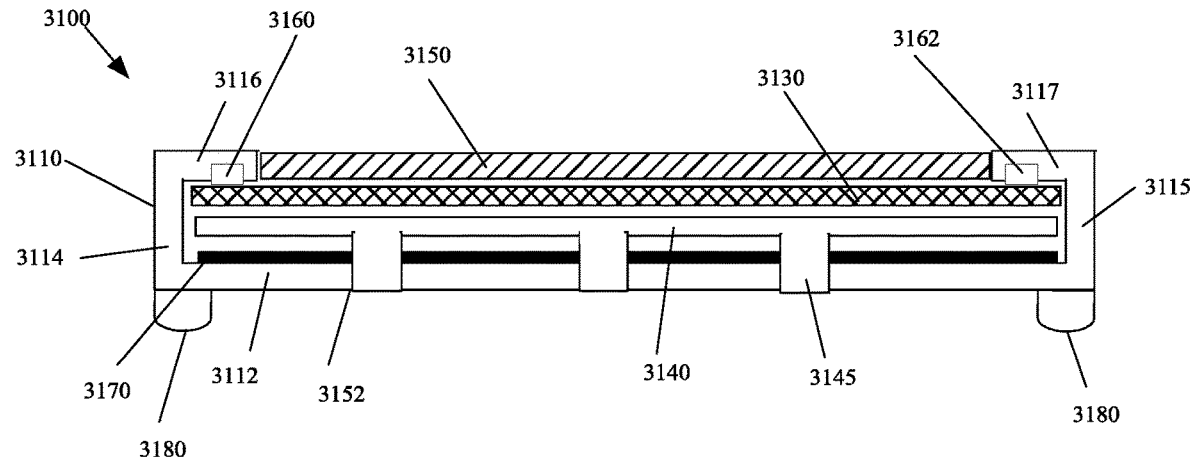
FIGS. 18A and 18B are cross-sectional views of an interactive display according to an exemplary embodiment of the present invention.
Figure 18B:
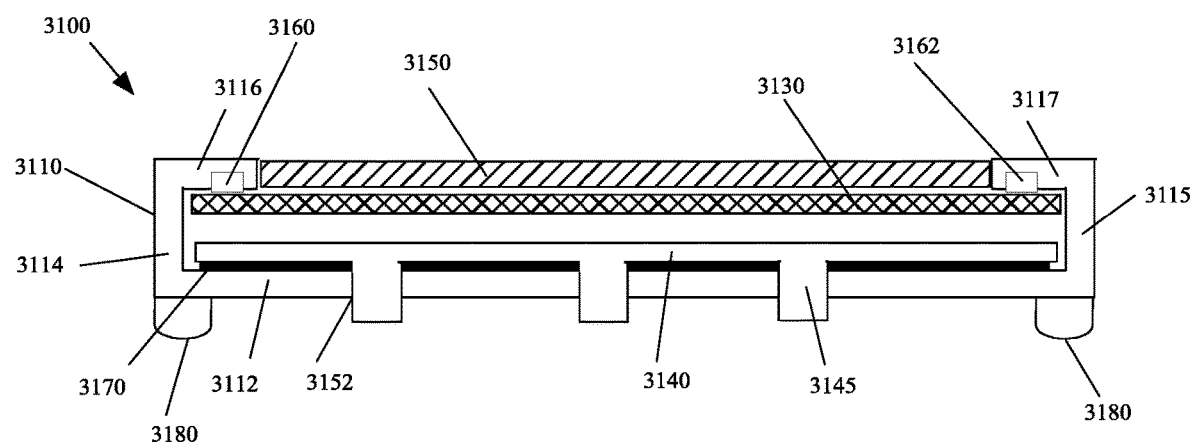

The physical keypad 3022 and imaged keypad 3024 may operate the same as in the previous exemplary embodiment. That is, the physical keys 3028 may provide tactile feedback to the user on a surface of the electronic device 3000 that is different from a surface on which the imaged keypad 3024 is displayed. For example, the physical keys 3028 may be automatically manipulated by actuators or through the use of material for the physical keys 3028 that changes shape under the influence of an electric or magnetic field. In this regard, FIGS. 18A and 18B are cross-sectional views of an interactive display 3100 according to another exemplary embodiment of the present invention. In FIG. 18A, the interactive display 3100 is in the keyboard-disabled mode, and in the FIG. 18B, the interactive display 3100 is in the keyboard-enabled mode. The interactive display 3100 may be housed within a frame element 3110 made up of a bottom wall 3112, side walls 3114, 3115 and top walls 3116, 3117. The interactive display 3100 may be housed within the frame element 3110 with the bottom surface of the interactive display 3100 resting on the bottom wall 3112 of the frame element 3110. The interactive display 3100 may include a physical keypad 3140 including physical keys 3145, a display device 3130 disposed over the physical keypad 3140, and a touchscreen panel 3150 disposed over the display device 3130.

The display device 3130 may be any suitable display device, such as, for example, a liquid crystal display (LCD), a digital light processing (DLP) display, a plasma display or a light-emitting diode (LED) display, to name a few. As is known in the art, the display device 3130 may include programmable elements that emit and/or block light to generate images. In the present embodiment, the display device 3130 may display an imaged keyboard when the interactive display 2100 is in the keyboard-enabled mode.

The physical keypad 3140 is a generally flat sheet or plate. The physical keys 3145 are formed on the top surface of the physical keypad 3140, and extend downwards towards the bottom wall 3112 of the frame element 3110. The physical keypad 3140 may be made of a transparent material, such as, for example, plastic or glass. Any number of physical keys 3145 may be formed on the physical keypad 3140. In an exemplary embodiment, the number and shape of the physical keys 3145 are made to correspond to the number and shape of the imaged keys in the imaged keyboard displayed by the display device 3130.

The touchscreen panel 3150 may be a transparent panel that generates a programming signal when pressure is applied to one or more areas on the touchscreen panel 3150. Various programming signals generated by the touchscreen panel 3150 may be sent to the display device 3130, resulting in formation or manipulation of images in the display device 3130. For example, a user may apply pressure to the touchscreen panel 3150 to activate the imaged keyboard and place the interactive display 3100 in the keyboard-enabled mode. Any suitable touchscreen technology may be used for the touchscreen panel 3150, such as, for example, resistive touchscreens, surface acoustic wave touchscreens, capacitive touchscreens, infrared touchscreens, strain gauge touchscreens, optical imaging, dispersive signal technology, acoustic pulse recognition, total internal reflection, and diffused laser imaging, to name a few.

The bottom wall 3112 of the frame element 3110 may include a number of openings 3152 that correspond with the physical keys 3145 of the physical keypad 3140. The physical keys 3145 extend through the openings 3152. When the interactive display 3100 is in the keyboard-disabled mode, the top surfaces of the physical keys 3145 may be co-planar with the bottom surface of the bottom wall 3112. When the interactive display 3100 is in the keyboard-enabled mode, the top surfaces of the physical keys 3145 may be raised or lowered relative to the bottom surface of the bottom wall 3112, so that the bottom wall 3112 includes a number of protrusions or indentations that correspond to the imaged keys in the imaged keypad. Thus, when the interactive display 3100 is in the keyboard-enabled mode, a user is able to feel the location of the various imaged keys based on the tactile feedback provided by the protrusions or indentations in the bottom wall 3112.

In an exemplary embodiment of the present invention, first and second actuators 3160, 3162, located on either side of the frame element 3110, may be used to manipulate the physical keypad 3140 and thereby raise and lower the physical keys 3145 relative to the bottom wall 3112. The first and second actuators 3160, 3162 may be any suitable actuators, such as, for example, mechanical actuators, such as springs, microelectromechanical devices (MEMS), piezoelectric actuators and magnetostrictive actuators, to name a few. It should be appreciated that the number of actuators is not limited to two, and any number of actuators located at any suitable position relative to the physical keypad 3140 may be used to raise and lower the physical keypad 3140.

The interactive display 3100 may also include a sensor 3170 that detects user interaction with the physical keypad 3140. The sensor 3170 may be any known or later-discovered sensor that is able to detect the presence and/or motion of the digits of a user's hand relative to the physical keypad 3140. The sensor 3170 may be, for example, a motion sensor, a thermal sensor or a pressure sensor, or any combination of a variety of sensors. The sensor 3170 may generate electrical signals based on the detected user interaction, and the generated signals may be sent to an image generator. The image generator may use the generated signals to display in the imaged keypad 3023 an imaged representation of the user interaction. Thus, even though the user's thumbs or fingers may be out of view behind the electronic device 300, the user will still have the ability to determine the location of his thumbs or fingers relative to the physical keys 3145 by viewing the imaged representation in the imaged keypad 3023. In an exemplary embodiment, the electronic device 3000 may include a switch to allow the user to selectively activate the imaging of user interaction within the imaged keypad 3023. In exemplary embodiments of the invention, the sensor 3170 may include a number of individual sensors, where each sensor corresponds to a particular physical key 3145 within the imaged keypad 3140.

As shown in FIGS. 18A and 18B, the bottom surface of the bottom wall 3112 may include protrusions 3180 that are able to support the electronic device 3100 on a surface. In this regard, the protrusions 3180 may prevent any one of the physical keys 3145 from being inadvertently activated by contact of the electronic device 3100 with the surface.

Figure 19:
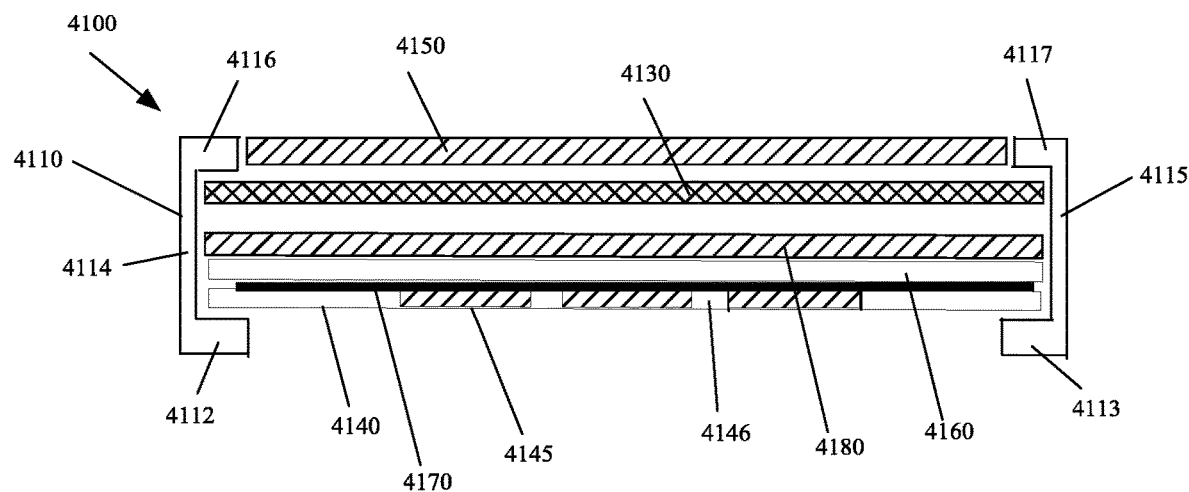
FIG. 19 is a cross-sectional view of an interactive display according to an exemplary embodiment of the present invention.

FIG. 19 is a cross-sectional views of an interactive display 4100 according to another exemplary embodiment of the present invention. In FIG. 19, the interactive display 4100 is in the keyboard-disabled mode. The interactive display 4100 may be housed within a frame element 4110 made up of a first surface walls 4112, 4113, side walls 4114, 4115 and second surface walls 4116, 4117. The interactive display 4100 includes a first surface display device 4130 and a first surface touchscreen panel 4150 disposed over the first surface display device 4130. As in previously described embodiments, the display device 4130 may display an imaged keyboard when the interactive display 4100 is in the keyboard-enabled mode, where the imaged keyboard includes a number of imaged keys. However, it should be appreciated that the imaged keyboard need not be displayed when the interactive display 4100 is in the keyboard-enabled mode.

The interactive display 4100 may also include a physical keypad 4140, a second surface touchscreen panel 4160 disposed over the physical keypad 4140, and a second surface display device 4180 disposed over the touchscreen panel 4160. The physical keypad 4140 in the present embodiment may include physical keys 4145 defined by a material that changes shape under the influence of an electric or magnetic field. For example, the physical keys 4145 may be made of a piezoelectric material, such as, for example, quartz, or a magnetostrictive material, such as, for example, ferromagnetic thin films. In the embodiment shown in FIG. 19, the physical keys 4145 are defined by a grid structure 4146 of piezoelectric material formed within the physical keypad 4140. Thus, the grid structure 4146 may either deflect downwards or upwards under the application of an electric field, thereby forming protrusions or indentations around the physical keys 4145. Thus, in the keyboard-enabled mode, the user is able to feel the location of the physical keys 4145. Any number of physical keys 4145 may be formed on the physical keypad 4140. In an exemplary embodiment, the number and shape of the physical keys 4145 are made to correspond to the number and shape of the imaged keys in the imaged keyboard that may be displayed by the first surface display device 4130. Thus, when the interactive display 4100 is in the keyboard-enabled mode, a user is able to feel the location of the various imaged keys based on the tactile feedback provided by the physical keys 4145.

As in the previous embodiment, the interactive display 4100 may also include a sensor 4170 that detects user interaction with the physical keypad 4140. The sensor 4170 may generate electrical signals based on the detected user interaction, and the generated signals may be sent to an image generator. The image generator may use the generated signals to display in the imaged keypad an imaged representation of the user interaction.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A portable device comprising:
an interactive display that comprises:
an image display device disposed at a surface of the portable device, the image display device configured to display a plurality of imaged keys;
a sensor that detects user interaction with the interactive display; and
an image generator that displays within the image display device an imaged representation of the user interaction,
wherein, with each user interaction, the imaged representation indicates activation of a corresponding one of the plurality of imaged keys;
wherein the interactive display has a keyboard-enabled mode in which the plurality of imaged keys are provided with tactile feedback and the imaged representation of the user interaction; and
wherein the interactive display has a keyboard-disabled mode in which the plurality of imaged keys are not provided with tactile feedback.

2. The portable device of claim 1, wherein the imaged representation comprises illumination, change of size, or visual distortion of one or more of the plurality of imaged keys.

3. The portable device of claim 1, further comprising one or more actuators configured to generate the tactile feedback.

4. The portable device of claim 3, wherein the one or more actuators comprise springs.

5. The portable device of claim 3, wherein the one or more actuators comprise piezoelectric actuators.

6. The portable device of claim 3, wherein the one or more actuators comprise magnetostrictive actuators.

7. The portable device of claim 1, wherein the image display device is selected from one of the following types of image display devices: liquid crystal displays, digital light processor displays, plasma displays and light emitting diode displays.

8. The portable device of claim 1, wherein the portable device is a cell phone.

9. The portable device of claim 1, wherein the portable device is a hand-held device.

10. The portable device of claim 1, wherein the sensor comprises a thermal sensor.

11. The portable device of claim 1, wherein the sensor comprises a pressure sensor.

* * * * *